(12) United States Patent
Knapp

(10) Patent No.: US 10,046,516 B2
(45) Date of Patent: Aug. 14, 2018

(54) FLEXIBLE HINGE GASKET

(75) Inventor: Mark Knapp, Ravenna, OH (US)

(73) Assignee: Springseal, Inc., Cleveland, OH (US)

( * ) Notice: Subject to any disclaimer, the term of this patent is extended or adjusted under 35 U.S.C. 154(b) by 1461 days.

(21) Appl. No.: 13/282,831

(22) Filed: Oct. 27, 2011

(65) Prior Publication Data

US 2012/0038117 A1 Feb. 16, 2012

Related U.S. Application Data

(63) Continuation-in-part of application No. 12/688,308, filed on Jan. 15, 2010, now abandoned.
(Continued)

(51) Int. Cl.
*F16L 25/00* (2006.01)
*B29C 65/00* (2006.01)
(Continued)

(52) U.S. Cl.
CPC ...... *B29C 66/1122* (2013.01); *B29C 47/0021* (2013.01); *B29C 65/342* (2013.01); *B29C 65/348* (2013.01); *B29C 65/3464* (2013.01); *B29C 65/3476* (2013.01); *B29C 65/362* (2013.01); *B29C 65/5057* (2013.01); *B29C 65/5071* (2013.01); *B29C 66/5221* (2013.01); *B29C 66/52296* (2013.01); *B29C 66/7252* (2013.01); *F16J 15/108* (2013.01); *F16L 25/0054* (2013.01); *B29C 47/128* (2013.01); *B29C 65/06* (2013.01); *B29C 65/0672* (2013.01); *B29C 65/08* (2013.01); *B29C 65/10* (2013.01); *B29C 65/14* (2013.01); *B29C 65/1412* (2013.01); *B29C 65/3468* (2013.01); *B29C 65/3676* (2013.01); *B29C 65/40* (2013.01); *B29C 65/4895* (2013.01);
(Continued)

(58) Field of Classification Search
CPC ....... F16L 25/0054; F16L 21/02; F16L 21/03; F16L 17/025; F16J 15/025; B28B 21/563
See application file for complete search history.

(56) References Cited

U.S. PATENT DOCUMENTS 2,259,940 A * 10/1941 Nathan ................. F16L 17/035
277/605
3,173,699 A * 3/1965 Nathan ................. F16L 17/025
277/605
(Continued)

OTHER PUBLICATIONS

Photograph of gasket similar to the profile shown in US Patent Publication No. 2008/0303224, 1 page.*
(Continued)

*Primary Examiner* — Eugene G Byrd
(74) *Attorney, Agent, or Firm* — Tarolli, Sundheim, Covell & Tummino LLP; John A. Yirga, Esq.

(57) ABSTRACT

A method and an annular integral gasket are provided for forming a sealing connection between a first tubular member and a second tubular member. The integral gasket comprises at least one flexible sealing portion adapted to form a sealing connection between a first tubular member and a second tubular member. The integral gasket further comprises a bonding layer adapted to be fixedly attached to a tubular member by a joining process. The integral gasket also comprises a body region adapted for supporting the flexible sealing portion and the bonding layer.

24 Claims, 22 Drawing Sheets

Related U.S. Application Data

(60) Provisional application No. 61/407,982, filed on Oct. 29, 2010, provisional application No. 61/252,835, filed on Oct. 19, 2009, provisional application No. 61/145,833, filed on Jan. 20, 2009.

(51) Int. Cl.

| | | |
|---|---|---|
| *B29C 47/00* | (2006.01) | |
| *B29C 65/34* | (2006.01) | |
| *B29C 65/36* | (2006.01) | |
| *B29C 65/50* | (2006.01) | |
| *F16J 15/10* | (2006.01) | |
| B29C 47/12 | (2006.01) | |
| B29C 65/06 | (2006.01) | |
| B29C 65/08 | (2006.01) | |
| B29C 65/10 | (2006.01) | |
| B29C 65/14 | (2006.01) | |
| B29C 65/40 | (2006.01) | |
| B29C 65/48 | (2006.01) | |
| B29C 35/08 | (2006.01) | |
| B29K 23/00 | (2006.01) | |
| B29K 27/06 | (2006.01) | |
| B29K 101/12 | (2006.01) | |
| B29L 23/18 | (2006.01) | |
| B29L 31/26 | (2006.01) | |

(52) U.S. Cl.
CPC ...... *B29C 66/71* (2013.01); *B29C 2035/0822* (2013.01); *B29K 2023/06* (2013.01); *B29K 2023/065* (2013.01); *B29K 2023/12* (2013.01); *B29K 2027/06* (2013.01); *B29K 2101/12* (2013.01); *B29L 2023/186* (2013.01); *B29L 2031/265* (2013.01)

(56) References Cited

U.S. PATENT DOCUMENTS

| | | | |
|---|---|---|---|
| 3,379,444 A | 4/1968 | Brummer et al. | |
| 4,182,519 A | 1/1980 | Wilson | |
| 4,223,895 A | 9/1980 | Roberts et al. | |
| 4,579,353 A * | 4/1986 | Bower ................. | F16L 17/032 |
| | | | 277/615 |
| D285,247 S | 8/1986 | Jornhagen | |
| 5,169,161 A | 12/1992 | Jones | |
| 5,288,087 A | 2/1994 | Bertoldo | |
| 5,320,697 A | 6/1994 | Hegler et al. | |
| 5,326,138 A * | 7/1994 | Claes ................. | F16L 25/0045 |
| | | | 285/110 |
| 6,299,176 B1 | 10/2001 | Guzowski et al. | |
| 6,336,640 B1 * | 1/2002 | Knapp ................ | F16L 25/0054 |
| | | | 277/606 |
| 6,343,623 B2 | 2/2002 | Hegler | |
| 6,367,802 B1 * | 4/2002 | Knapp .................... | F16L 21/03 |
| | | | 277/314 |
| 6,550,775 B2 * | 4/2003 | Knapp .................... | F16L 21/03 |
| | | | 277/314 |
| 6,941,972 B2 * | 9/2005 | Toliver .................... | F16L 11/15 |
| | | | 138/115 |
| 6,948,718 B2 * | 9/2005 | Shaffer ............... | F16L 25/0054 |
| | | | 277/604 |
| 7,185,894 B2 * | 3/2007 | Kish ...................... | F16L 17/025 |
| | | | 277/607 |
| 7,469,905 B2 | 12/2008 | Knapp | |
| 7,503,992 B2 | 3/2009 | Knapp | |
| 7,513,536 B2 | 4/2009 | Corbett et al. | |
| 7,594,664 B2 | 9/2009 | Maskaliunas | |
| 7,731,884 B2 | 6/2010 | Knapp et al. | |
| 7,753,376 B2 | 7/2010 | Kondo et al. | |
| D631,948 S | 2/2011 | Yoshida et al. | |
| D638,522 S | 5/2011 | Yoshida et al. | |
| D644,306 S * | 8/2011 | Douglass, III ............... | D23/269 |
| D706,908 S * | 6/2014 | Knapp ......................... | D23/269 |
| 8,820,801 B2 * | 9/2014 | Sutton ................... | F16L 21/035 |
| | | | 285/374 |
| 2005/0230972 A1 | 10/2005 | Owen et al. | |
| 2007/0181654 A1 | 8/2007 | Knapp | |
| 2007/0290455 A1 | 12/2007 | Knapp et al. | |
| 2008/0088096 A1 * | 4/2008 | Andrick .................. | F16L 21/03 |
| | | | 277/617 |
| 2008/0303224 A1 | 12/2008 | Knapp | |
| 2009/0060635 A1 | 3/2009 | Jones et al. | |
| 2009/0127852 A1 | 5/2009 | Sutton et al. | |
| 2009/0133841 A1 | 5/2009 | Knapp | |
| 2009/0206553 A1 | 8/2009 | Kanzaki | |
| 2010/0007090 A1 | 1/2010 | Kobayashi | |
| 2010/0181766 A1 * | 7/2010 | Knapp .................. | B29C 65/342 |
| | | | 285/374 |
| 2012/0274031 A1 * | 11/2012 | Knapp ................... | F16J 15/025 |
| | | | 277/609 |

OTHER PUBLICATIONS

Photograph of gasket similar to the profile shown in U.S. Pat. No. 6,550,775, 1 page.*

Photograph of gasket similar to the profile shown in U.S. Pat. No. 6,336,640, 1 page.*

Photograph of a gasket, 1 page.*

Two (2) page article entitled "Positioning Powercore", Powercore Plastic Welding System, print out from web site http://www.powercore.com/welding_positioning_pc.htm. Upon information and belief, the above article was published more than one year prior to the filing date of the subject application, namely before Jan. 19, 2008.

One (1) page article entitled "Stripping Overview", Powercore Plastic Welding System, print out from web site http://www.powercore.com/connection_stripping_overview.htm. Upon information and belief, the above article was published more than one year prior to the filing date of the subject application, namely before Jan. 19, 2008.

Two (2) page article entitled "Introduction", Powercore Plastic Welding System, print out from web site http://www.powercore.com/general_introduction.htm. Upon information and belief, the above article was published more than one year prior to the filing date of the subject application, namely before Jan. 19, 2008.

One (1) page article entitled "What is Powercore?", Powercore Plastic Welding System, print out from web site http://www.powercore.com. Upon information and belief, the above article was published more then one year prior to the filing date of the subject application, namely before Jan. 19, 2008.

Two (2) page article entitled "Current Flow & Times", Powercore Plastic Welding System, print out from web site http://www.powercore.com/tech_current.htm. Upon information and belief, the above article was published more than one year prior to the filing date of the subject application, namely before Jan. 19, 2008.

Three (3) page article entitled "Applications—Welding Thermoplastics", Powercore Plastic Welding System, print out from web site http://powercore.com/general_applications.htm. Upon information and belief, the above article was published more then one year prior to the filing date of the subject application, namely before Jan. 19, 2008.

Two page article entitled "Positioning Powercore", Powercore Plastic Welding System, print out from web site http://www.powercore.com/welding_positioning_pc.htm.

One page article entitled "Stripping Overview", Powercore Plastic Welding System, print out from web site http://www.powercore.com/connection_stripping_overview.htm.

Two page article entitled "Introduction", Powercore Plastic Welding System, print out from web site http://www.powercore.com/general_introduction.htm.

One page article entitled "What is Powercore?", Powercore Plastic Welding System, print out from web site http://www.powercore.com.

(56) References Cited

OTHER PUBLICATIONS

Two page article entitled "Current Flow & Times", Powercore Plastic Welding System, print out from web site http://www.powercore.com/tech_current.htm.
Three page article entitled "Applications—Welding Thermoplastics", Powercore Plastic Welding System, print out from web site http://www.powercore.com/general_applications.htm.

* cited by examiner

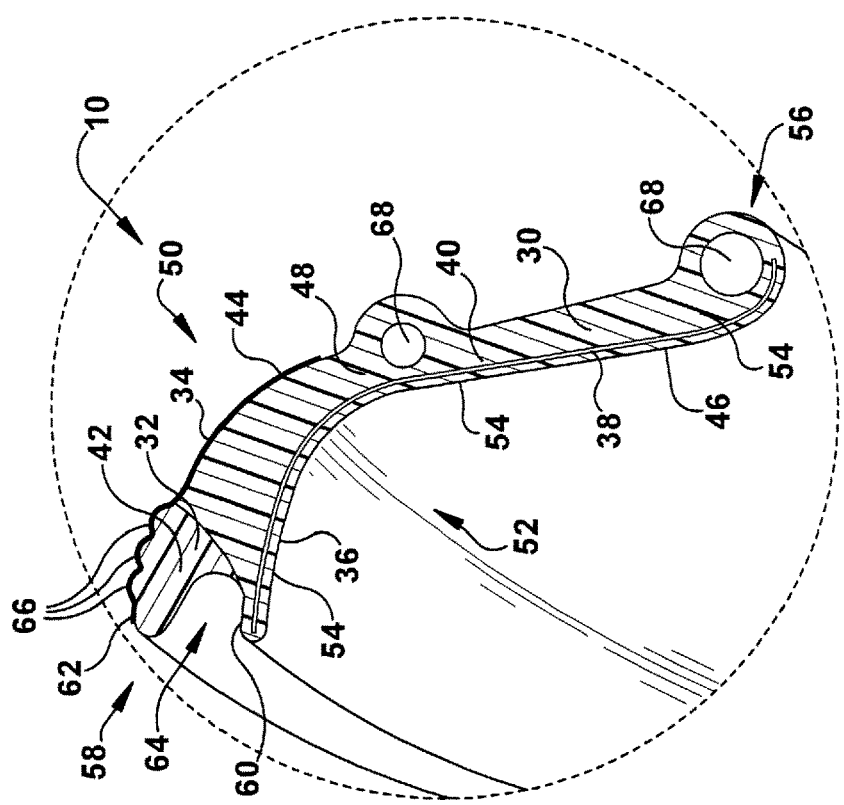
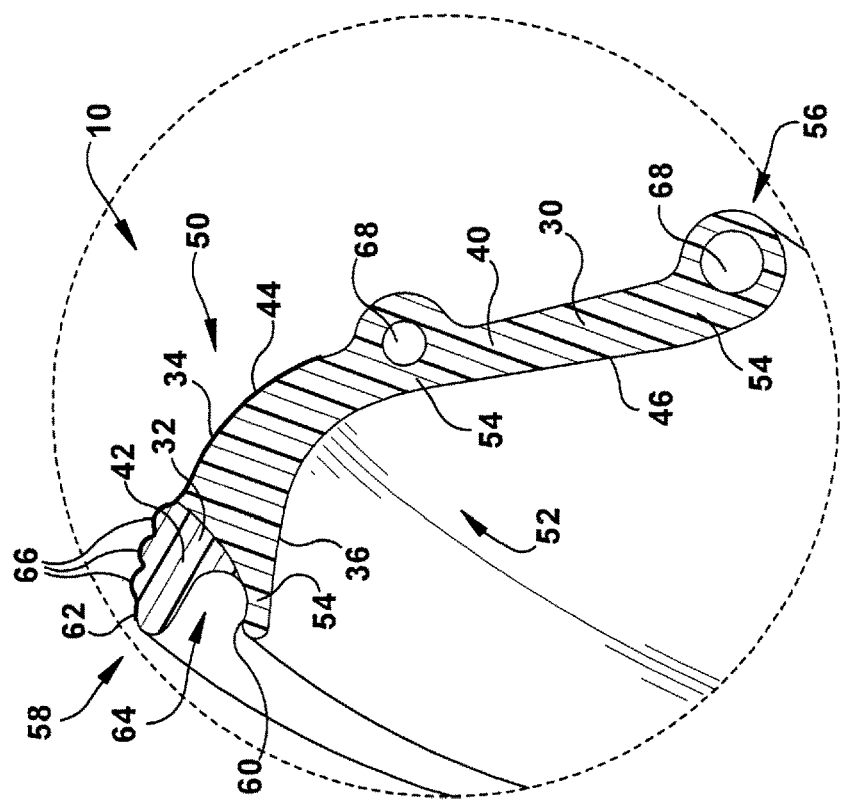

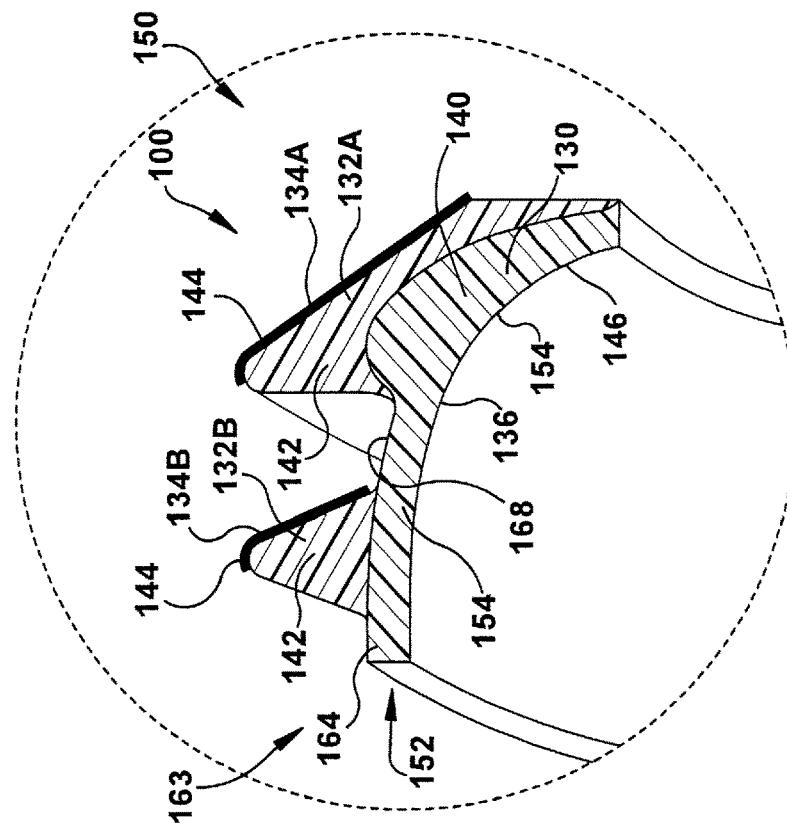
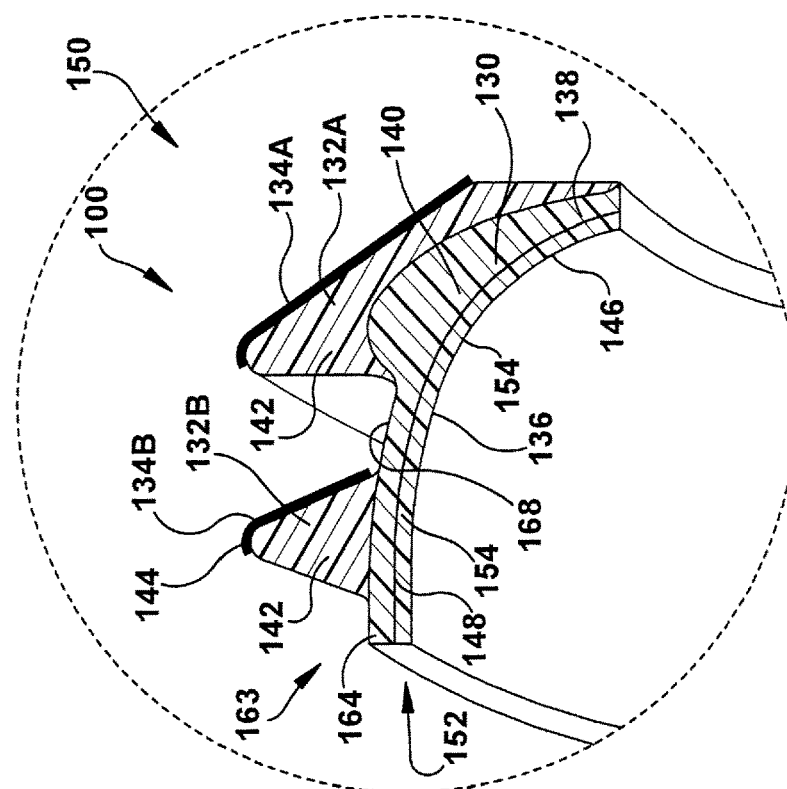

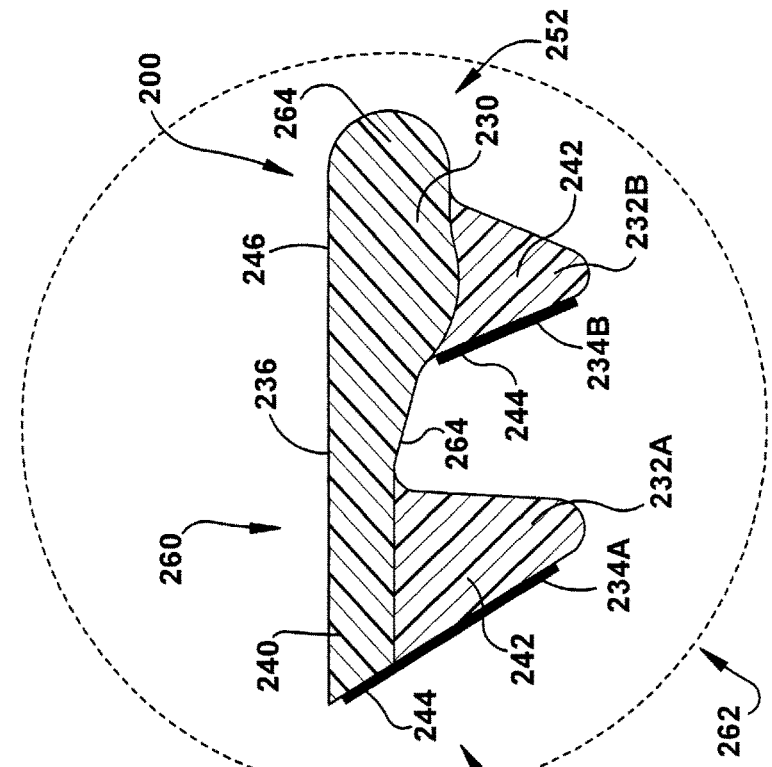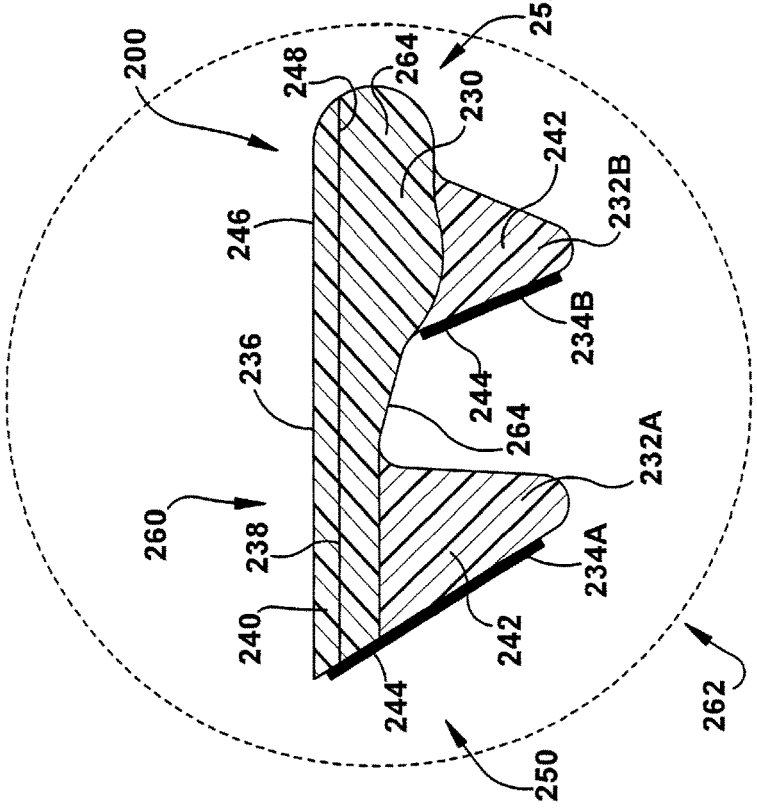

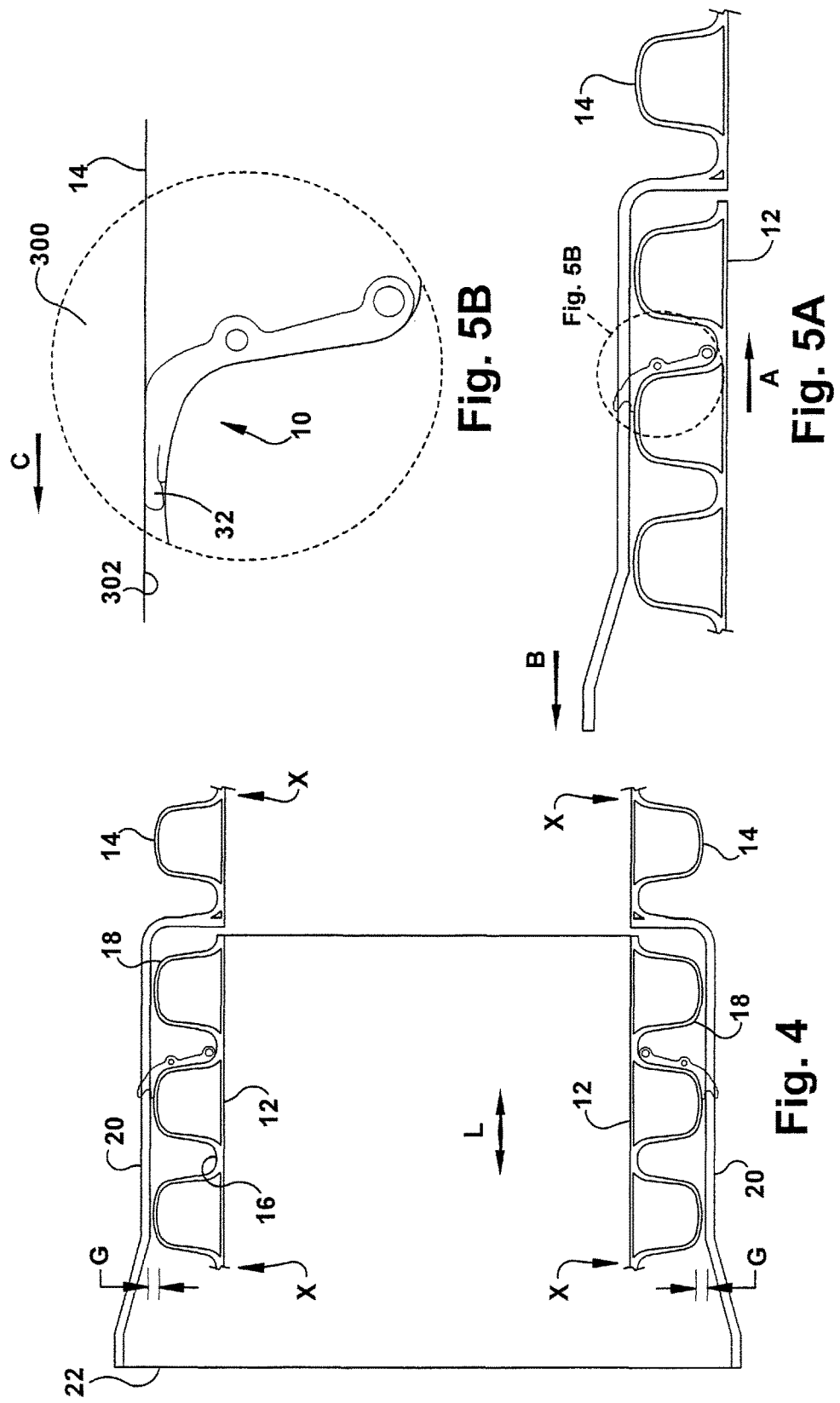

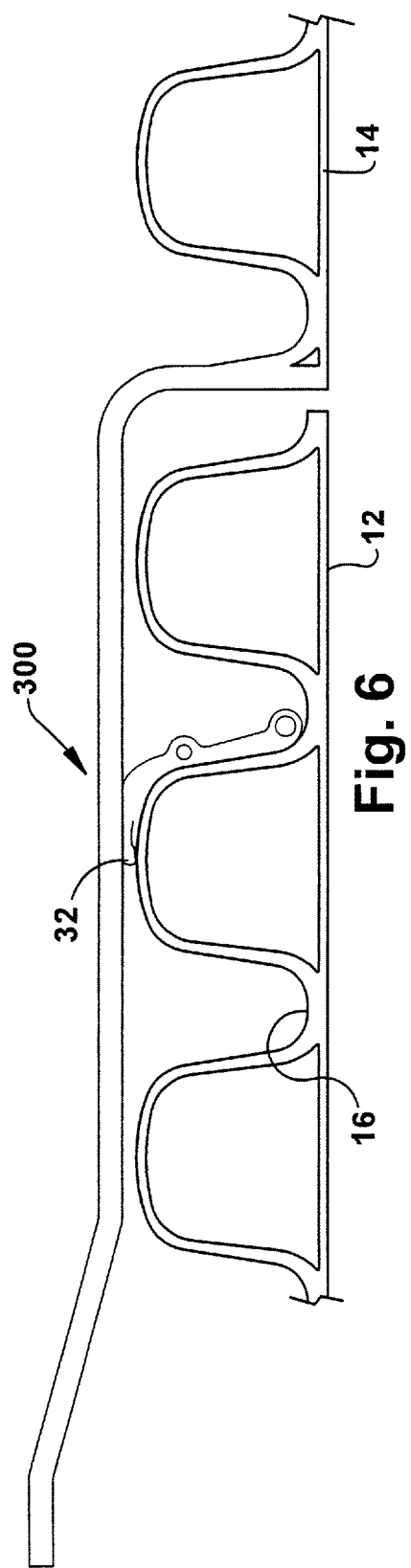

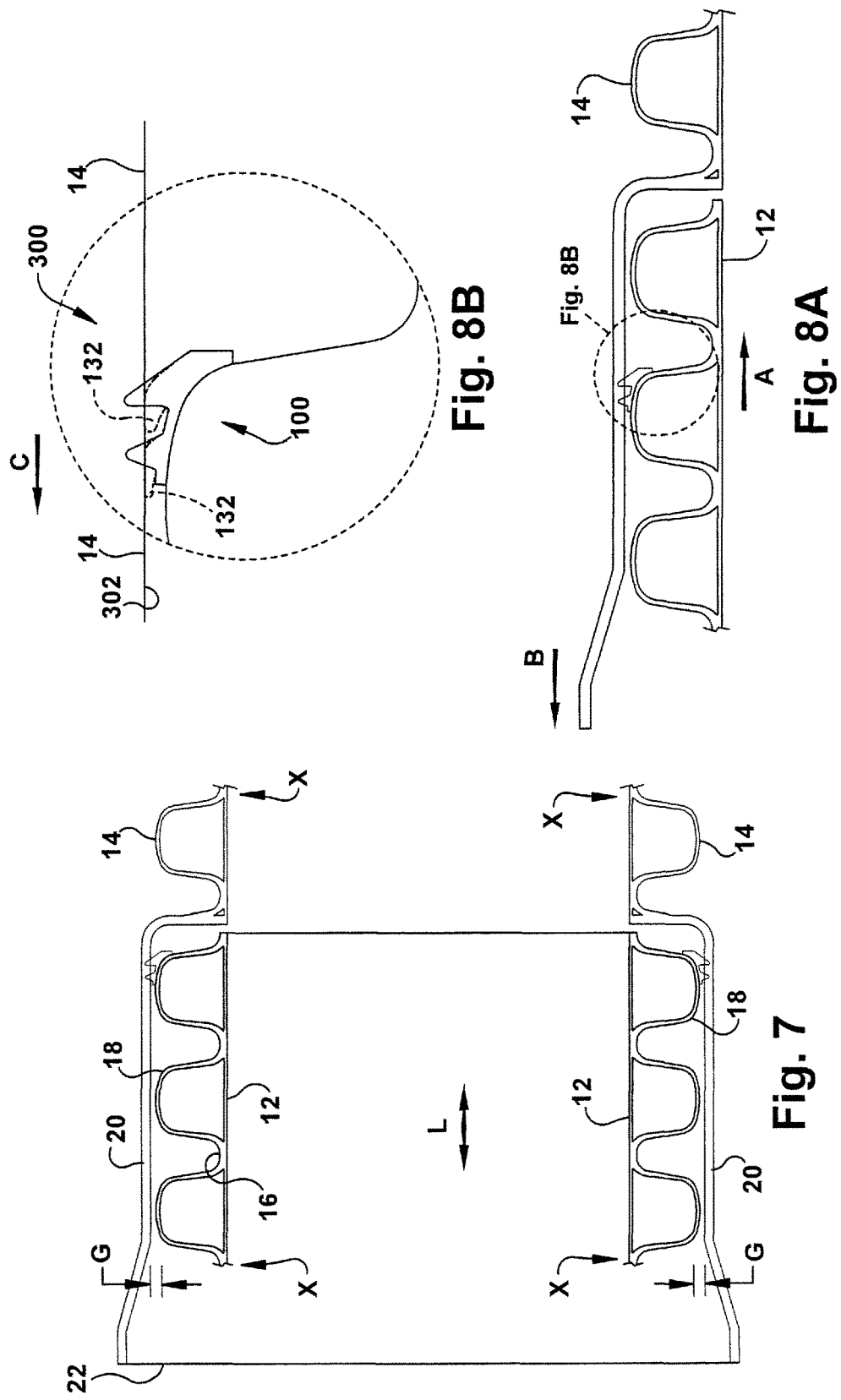

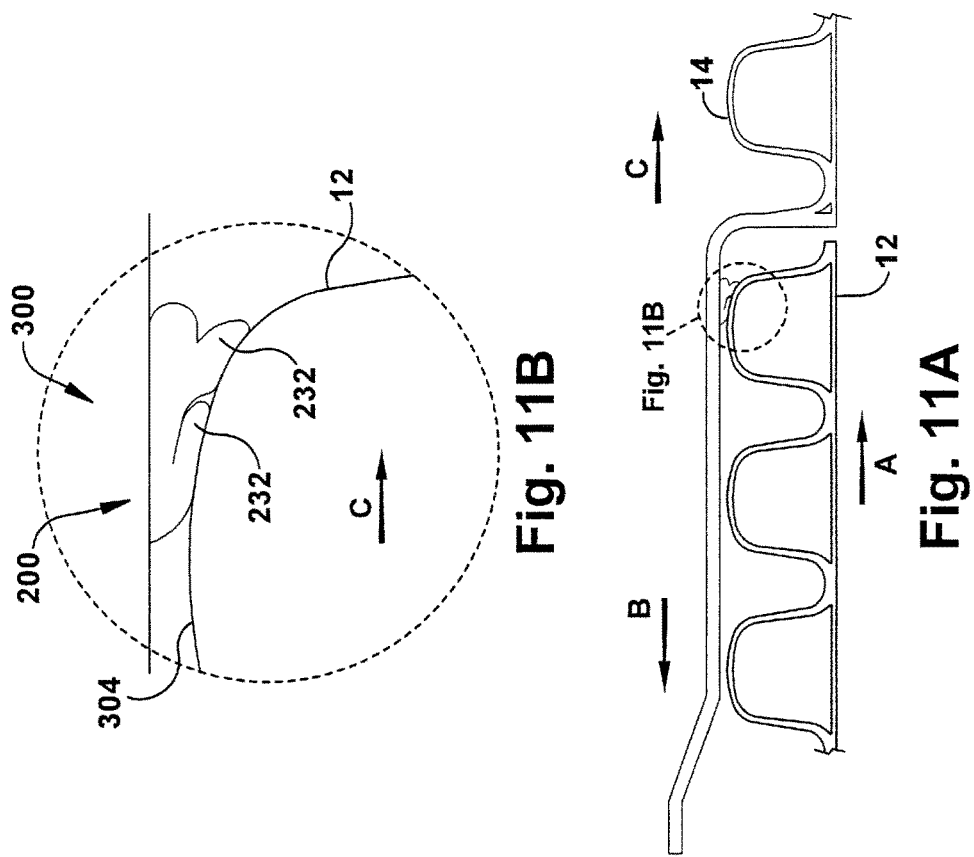
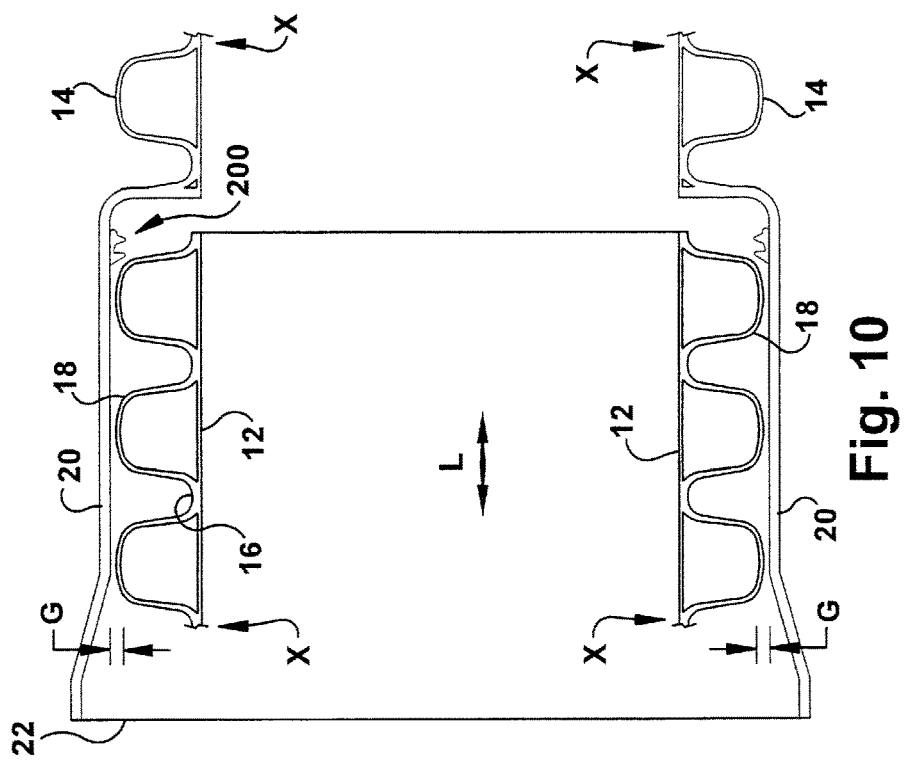

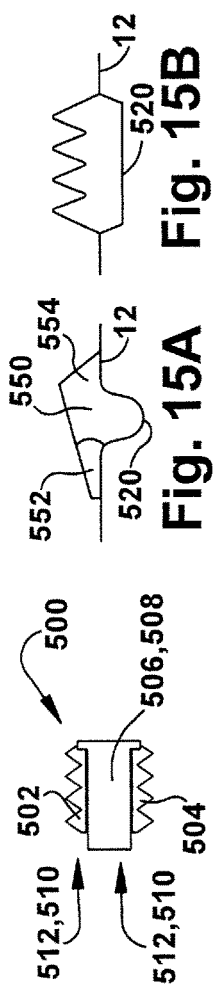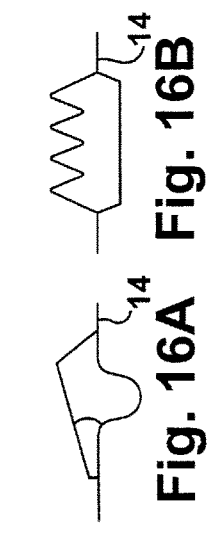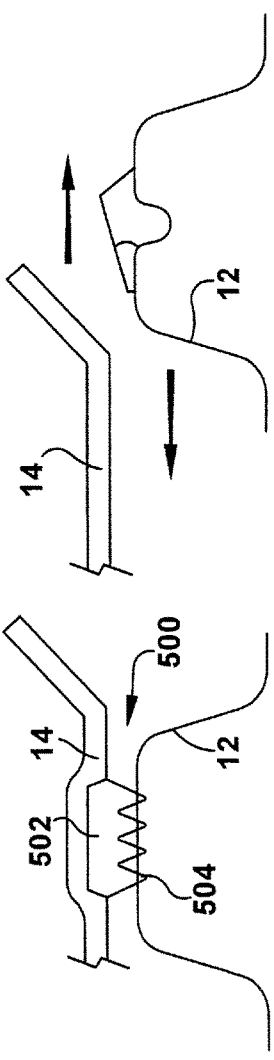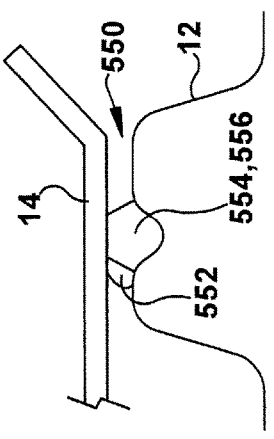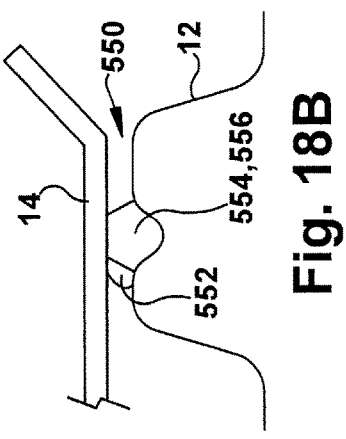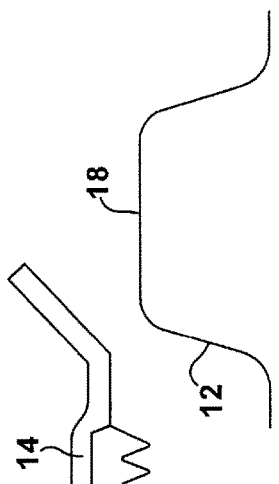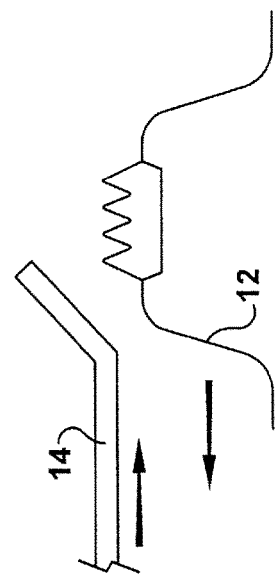

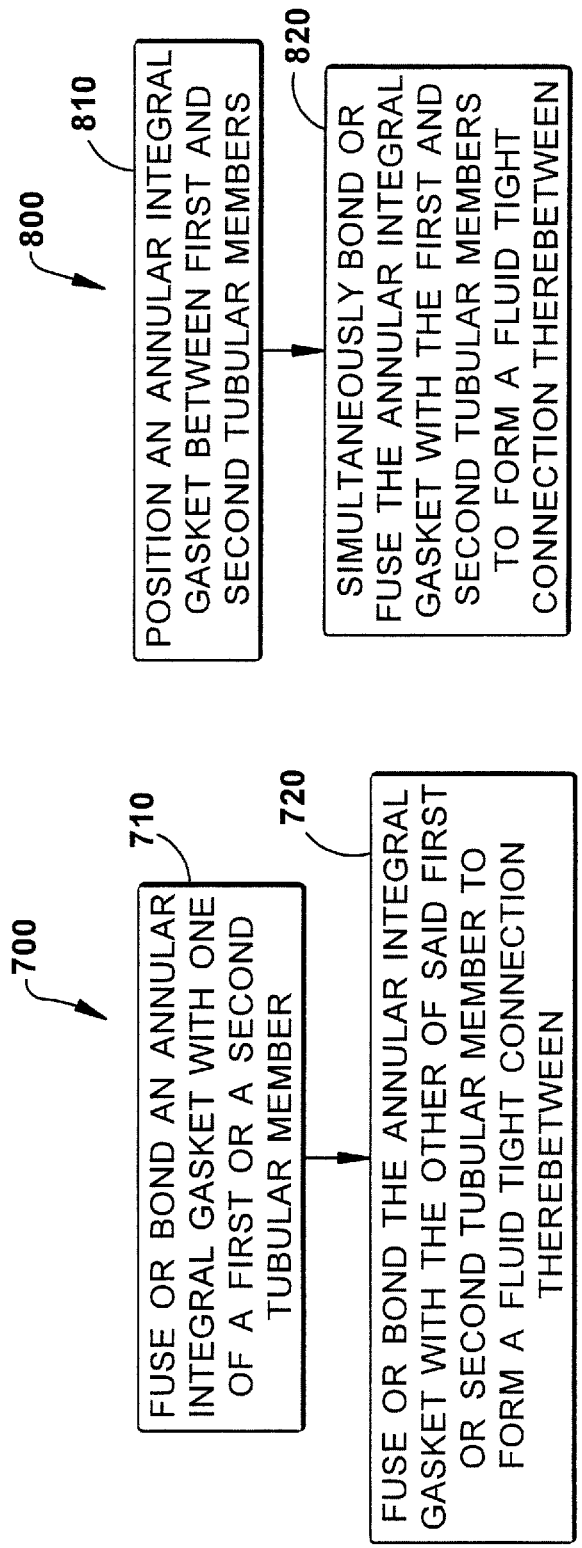

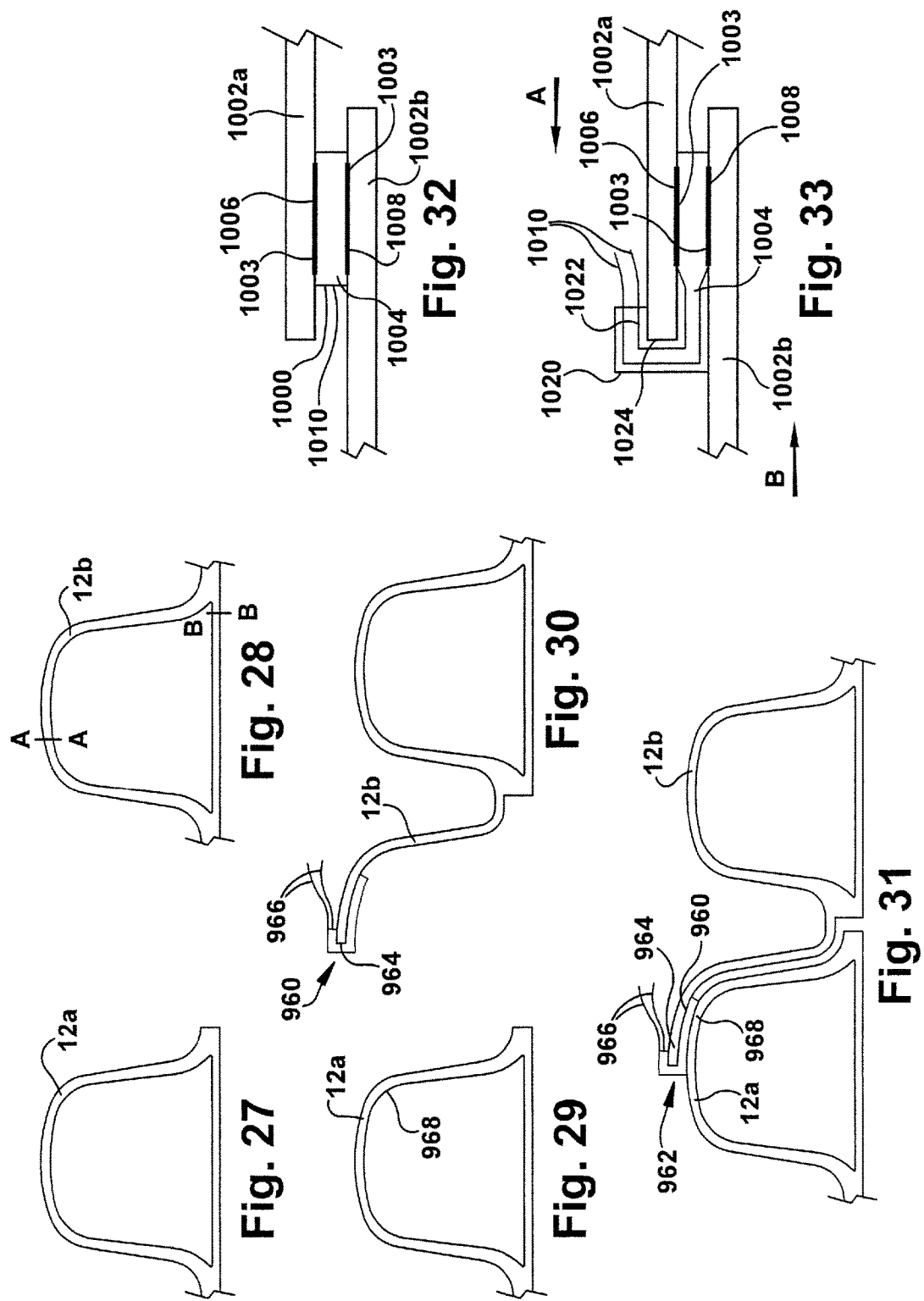

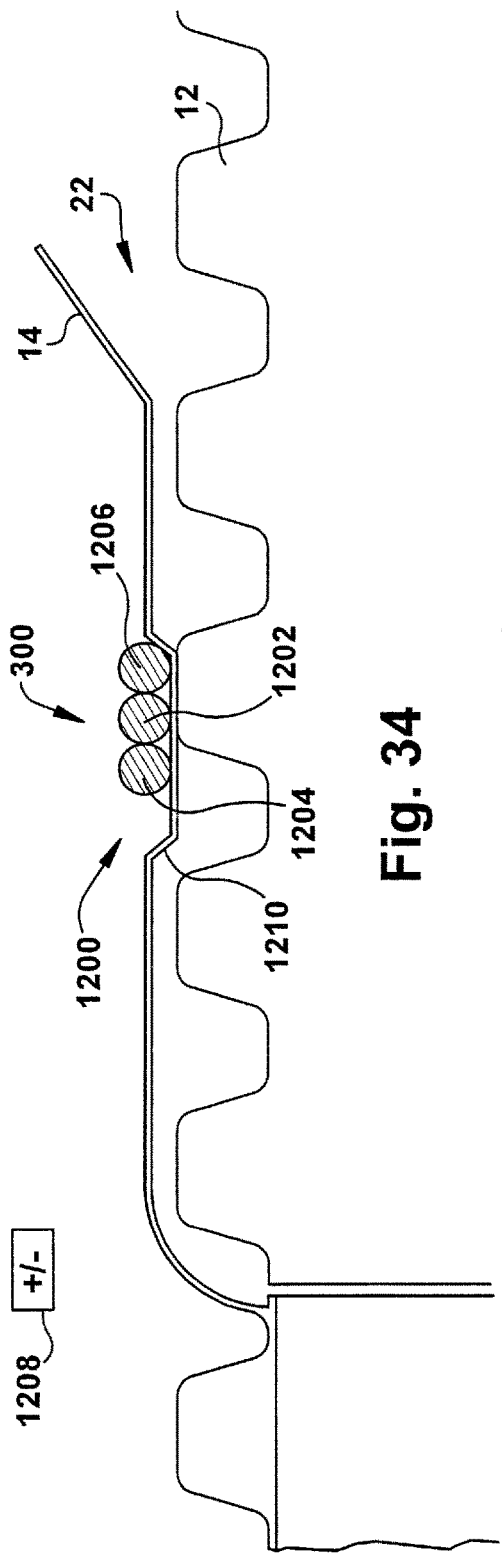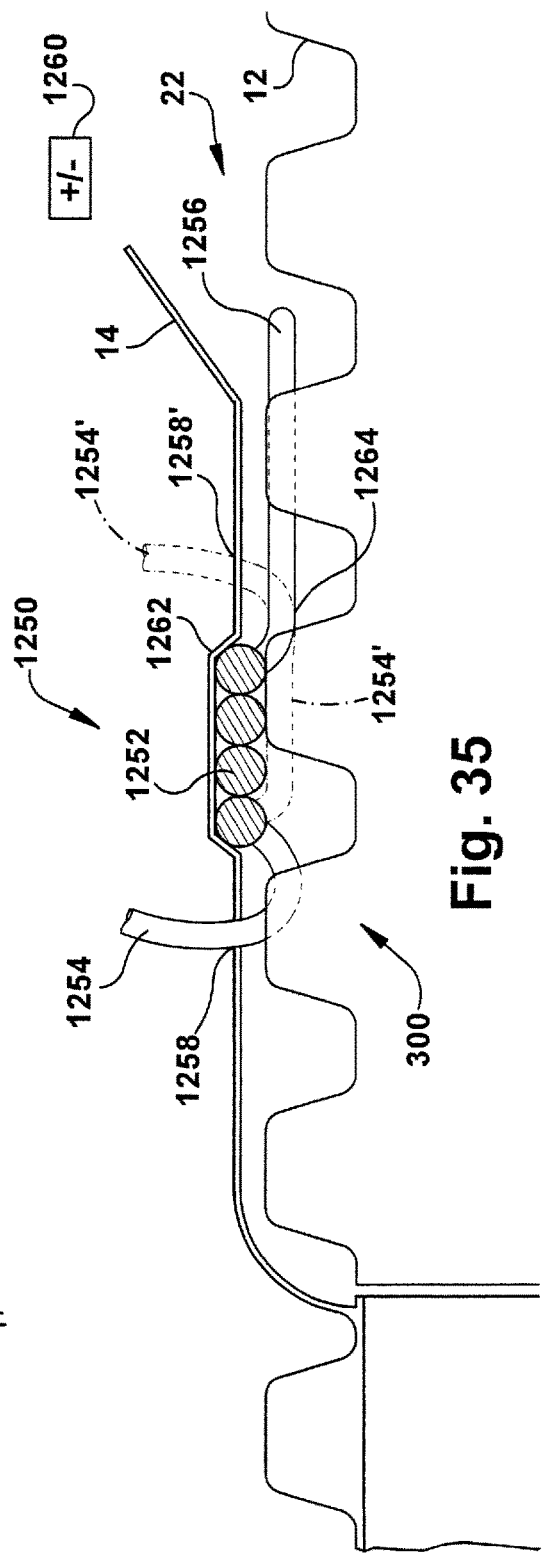

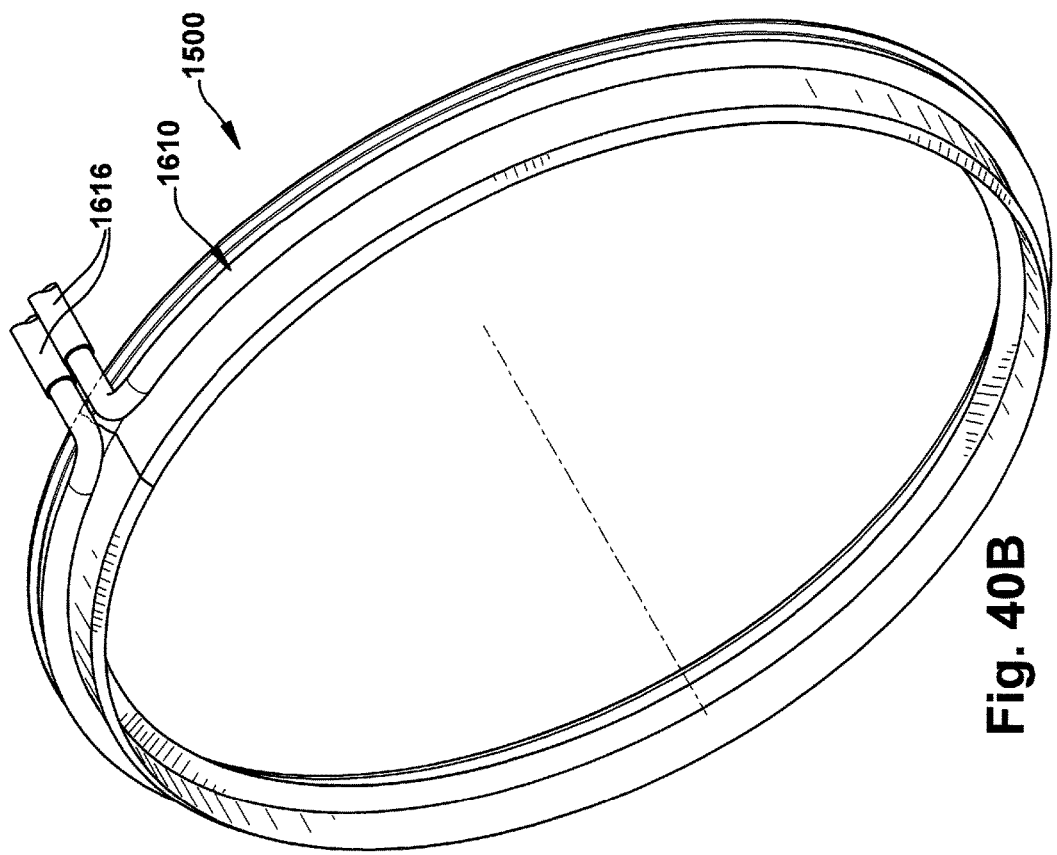
Fig. 40B
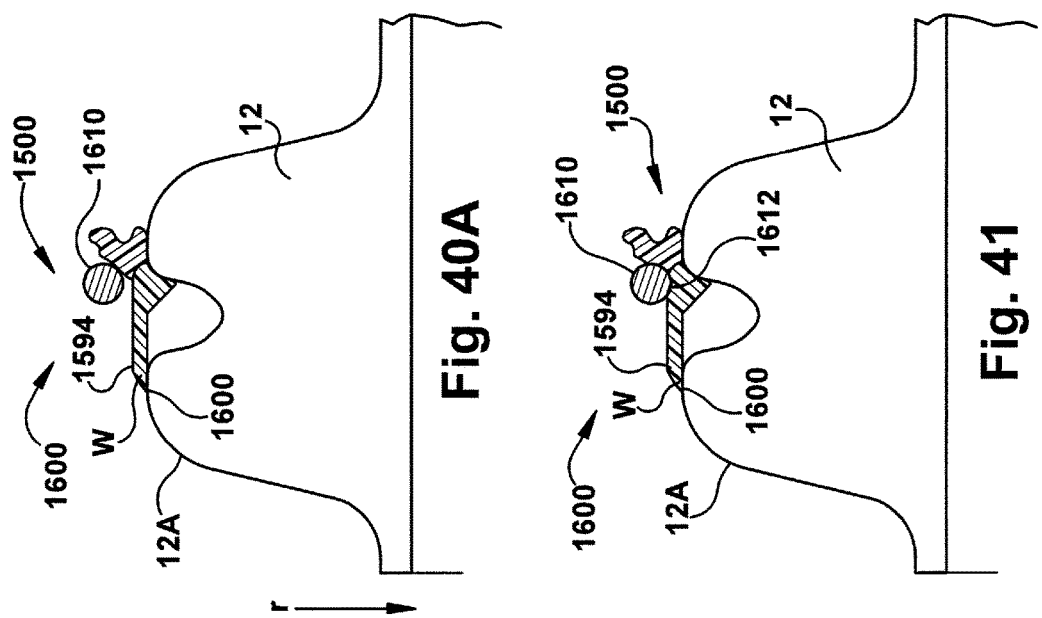
Fig. 40A
Fig. 41

FLEXIBLE HINGE GASKET

CROSS REFERENCE TO RELATED APPLICATIONS

The following application is a Continuation-In-Part application that claims priority from currently U.S. Provisional Application 61/407,982 filed Oct. 29, 2010 entitled FLEXIBLE HINGE GASKET and currently pending U.S. Nonprovisional patent application Ser. No. 12/688,308 filed Jan. 15, 2010 entitled INTEGRAL PIPE GASKET that claims priority to U.S. Provisional Application Ser. No. 61/252,835 filed Oct. 19, 2009 entitled INTEGRAL PIPE GASKET and U.S. Provisional Application Ser. No. 61/145,833 filed Jan. 20, 2009 entitled INTEGRAL PIPE GASKET. Priority is claimed to all of the above-identified U.S. patent applications, which are also incorporated herein by reference in their entireties for all purposes.

TECHNICAL FIELD

The present disclosure relates to a gasket and method of attaching the gasket to a mating pipe, a joining pipe, or both to form an integral connection therebetween such that a fluid-tight assembly is formed between the gasket, the mating pipe, and adjoining pipe.

BACKGROUND

For the transport of fluids that includes both liquids and gases, it is desirable to form a fluid-tight sealed connection when jointing two or more pipe sections together. Numerous applications exists for transporting drain or storm, potable, or waste water using pipe sections fabricated from thermoplastic materials such as polyethylene, polypropylene, polyvinyl chloride (PVC), high density polyethylene (HDPE), and the like.

One common pipe configuration for the transport of fluids includes dual-wall corrugated piping, having a smooth interior wall, optimizing fluid flow characteristics and a corrugated outer wall for enhanced strength and durability. Connecting the dual wall corrugated pipe sections is generally achieved by installing an oversized end of a first corrugated pipe section referred to as a bell over a spigot located at the end of a second corrugated pipe section. Seated in the one of the many corrugated sections or annular grooves of the spigot's outer diameter is typically a gasket that assists in forming a fluid-tight seal between the pipe sections. One example of a gasket design for such application, as well as for other purposes includes U.S. Pat. No. 7,469,905 that issued Dec. 30, 2008 and assigned to SPRINGSEAL® (Streetsboro, Ohio) entitled PERMANENTLY LUBRICATED FILM GASKET AND METHOD OF MANUFACTURE (hereinafter "the '905 Patent"), which is incorporated herein by reference in its entirety. The elastomeric gasket contacts each of the pipe sections to form a sealed connection assembly between the pipe sections.

Typically, a large frictional force is encountered when the spigot and the gasket are inserted into the bell of the outer pipe section. As one end of the inner pipe is pushed into the enlarged end or bell of the outer pipe section's pipe connector, the gasket is at times undesirably pulled from the groove by the large frictional force. When the pipe is not properly sealed, ground water may leak into the pipe or fluid may leak out of the pipe and contaminate the ground or area surrounding the pipe sections.

It is not uncommon for the joining sections of the corrugated pipe to be exposed to numerous forces causing stress to the gasket over the life of the connection. Such stress may allow the gasket to move from its desired location or allow debris to infiltrate the gasket seat, reducing the effectiveness of the sealing assembly connection.

SUMMARY

One example embodiment of the present disclosure includes an annular integral gasket for forming a sealing connection between a first tubular member and a second tubular member. The integral gasket comprises at least one flexible sealing portion adapted to form a sealing connection between a first tubular member and a second tubular member and a bonding layer adapted to be fixedly attached to a tubular member by a joining process. The integral gasket further comprises a body region adapted for supporting the flexible sealing portion and the bonding layer.

Another example embodiment of the present disclosure includes a fluid-tight sealing assembly formed between first and second tubular members and an annular integral gasket fixedly attached to one of the first and second tubular members. The fluid-tight sealing assembly comprising a first tubular member having a main body and oppposingly located first and second ends. The first tubular member further comprising a spigot region located at one of the first tubular member's first and second ends. The fluid-tight sealing assembly further comprises a second tubular member having a main body and oppposingly located first and second ends. The second tubular member further comprising a bell portion located at one of the second tubular member's first and second ends. The bell portion is adapted for the insertion of the spigot of the first tubular member. The fluid-tight sealing assembly also comprises an annular integral gasket adapted to be fixedly attached to one of the first and second tubular member to form a fluid-tight sealing assembly therebetween. The annular integral gasket comprises a body region, flexible sealing portion, and bonding layer. The bonding layer is formed from a material compatible for fusing with one of the first and second tubular members. The fluid-tight sealing assembly additionally comprises a fused bond formed with the annular integral gasket and one of the first and second tubular members.

A further example embodiment of the present disclosure includes a method for forming an integral gasket for forming a fused bond and fluid-tight seal between first and second pipe members. The method comprises forming a sealing member from a first material as a portion of the integral gasket and forming a bonding layer from a second material different from the first material as a portion of the integral gasket. The method further comprises processing the steps of forming the sealing member and bonding layer in one of a single extruded and molded operation to collectively form the integral gasket.

An additional example embodiment of the present disclosure includes an annular integral gasket for forming an integral fluid-tight connection between first and second tubular members. The annular integral gasket comprises an annular body member formed from a first material having first and second ends, the first and second ends are in contact with the first and second tubular members during assembly. The annular integral gasket also comprises an electro-fusing material annularly located at the first and second ends and upon the application of energy to the electro-fusing material, an integral fluid-tight connection is formed with first and second tubular members and the annular gasket at the first and second ends. The annular integral gasket also comprises a flexible portion located within the annular body member that provides a flexible annular connection between tubular members in the integral fluid-tight connection such that the flexible portion allows both lateral and longitudinal independent movement of the tubular members.

Another example embodiment of the present disclosure comprises an annular integral gasket assembly comprising at least one flexible sealing portion adapted to form a sealing connection between a first tubular member and a second tubular member. The gasket assembly further comprises a body region adapted for supporting the flexible sealing portion, the body region is integrally connected to the sealing portion. The gasket assembly further comprises an annular fusing arrangement positioned on an upper portion of the gasket and a first fusing zone located at an apex of the body region. The first fusing zone is adapted to form a permanent connection between the gasket and first tubular member. The gasket assembly also comprises a second fusing zone located on the upper portion of the gasket, the second fusing zone is adapted to form a permanent connection between the annular fusing arrangement and the gasket.

While another example embodiment comprises an annular integral gasket assembly having at least one flexible sealing portion adapted to form a sealing connection between a first tubular member and a second tubular member. The gasket further comprises a body region adapted for supporting the flexible sealing portion, the body region being integrally connected by one of molding and extruding the body region to the sealing portion. The body region has a composition formed from both a flexing agent and a rigid plastic. The body region also has a first durometer and the sealing portion has a second durometer, wherein the first durometer is higher than the second durometer.

BRIEF DESCRIPTION OF THE DRAWINGS

The foregoing and other features and advantages of the present disclosure will become apparent to one skilled in the art to which the present disclosure relates upon consideration of the following description of the invention with reference to the accompanying drawings, wherein like reference numerals, unless otherwise described refer to like parts throughout the drawings and in which:

FIG. 1 is a cross sectional perspective view of an annular conforming integral gasket constructed in accordance with one example embodiment of the present disclosure;

FIG. 1A is a cross sectional view of an annular conforming integral gasket constructed in accordance with one example embodiment of the present disclosure;

FIG. 2 is a cross sectional view of an annular universal integral gasket constructed in accordance with one example embodiment of the present disclosure;

FIG. 2A is a cross sectional view of an annular universal integral gasket constructed in accordance with one example embodiment of the present disclosure;

FIG. 3 is a cross sectional view of an annular universal integral gasket constructed in accordance with another embodiment of the present disclosure;

FIG. 3A is a cross sectional view of an annular universal integral gasket constructed in accordance with another embodiment of the present disclosure;

FIG. 4 is a sectional view illustrating the annular conforming integral gasket embodiment of FIG. 1 seated and fused to a channel portion of a first inner corrugated pipe spigot received in a bell portion of a second corrugated pipe, forming a fluid-tight seal assembly of one example embodiment of the present disclosure;

FIG. 5A is a partial sectional view of the fluid-tight seal assembly of FIG. 4 illustrating the direction the first and second pipe sections are moved during assembly;

FIG. 5B is a magnified view of the annular conforming integral gasket embodiment of FIG. 1, illustrating the direction of the forces imposed on the gasket during assembly and the deformation that results in achieving a fluid-tight seal during assembly;

FIG. 6 is a partial sectional view illustrating the annular conforming integral gasket embodiment of FIG. 1 fused and seated in a channel portion of a first corrugated pipe spigot received in a bell portion of a second corrugated pipe deformed as a result of forming a fluid-tight seal assembly of one example embodiment of the present disclosure;

FIG. 7 is a sectional view illustrating the annular universal integral gasket embodiment of FIG. 2 fused to a crown portion of a first corrugated pipe spigot received in a bell portion of a second corrugated pipe, forming a fluid-tight seal assembly of one example embodiment of the present disclosure;

FIG. 8A is a partial sectional view of the fluid-tight seal assembly of FIG. 7 illustrating the direction the first and second pipe sections are moved during assembly;

FIG. 8B is a magnified view of the annular universal integral gasket embodiment of FIG. 1, illustrating the direction of the forces imposed on the gasket during assembly and the deformation that results in achieving a fluid-tight seal during assembly;

FIG. 10 is a sectional view illustrating the annular universal integral gasket embodiment of FIG. 3 fused to a inner diameter portion of first corrugated pipe's bell that is receiving spigot portion of a second corrugated pipe advancing to form a fluid-tight seal assembly of one example embodiment of the present disclosure;

FIG. 11A is a partial sectional view of the fluid-tight seal assembly of FIG. 10 illustrating the direction the first and second pipe sections are moved during assembly;

FIG. 11B is a magnified view of the annular universal integral gasket embodiment of FIG. 3, illustrating the direction of the forces imposed on the gasket during assembly and the deformation that results in achieving a fluid-tight seal during assembly;

FIG. 14 is a cross sectional side view of an annular integral gasket constructed in accordance with one example embodiment of the present disclosure;

FIG. 15A is a cross sectional side view of an annular wedge integral gasket constructed in accordance with one example embodiment of the present disclosure;

FIG. 15B is the annular integral gasket of FIG. 14 positioned in a recess of a first tubular member;

FIG. 16A is the annular wedge integral gasket of FIG. 15A positioned in a recess of a first tubular member;

FIG. 16B is the annular integral gasket of FIG. 14 positioned in a recess of a first tubular member;

FIG. 17 is the annular integral gasket of FIG. 14 integrally formed with first and second tubular members;

FIG. 18A is the positioning during assembly of first and second tubular members over annular wedge integral gasket of FIG. 15A;

FIG. 18B is the annular wedge integral gasket of FIG. 15A integrally formed with first and second tubular members;

FIG. 19 is the positioning during assembly of first and second tubular members over annular integral gasket of FIG. 14;

FIG. 20 is an annular integral gasket of FIG. 14 bonded or fused within a recess of a bell of a second tubular member;

FIG. 21 is a flowchart of exemplary embodiment of the present disclosure illustrating a method of fusing or bonding an annular integral gasket to pipe sections in accordance with one example embodiment of the present disclosure;

FIG. 22 is a flowchart of exemplary embodiment of the present disclosure illustrating a method of simultaneously fusing or bonding an annular integral gasket to pipe sections in accordance with one example embodiment of the present disclosure;

FIG. 27 is an annular integral gasket for forming a flexible integral connection in accordance with another embodiment of the present disclosure;

FIG. 28 is an annular integral gasket for forming a flexible integral connection in accordance with another embodiment of the present disclosure;

FIG. 29 is an annular integral gasket for forming a flexible integral connection in accordance with another embodiment of the present disclosure;

FIG. 30 is an annular integral gasket for forming a flexible integral connection in accordance with another embodiment of the present disclosure;

FIG. 31 is an annular integral gasket for forming a flexible integral connection in accordance with another embodiment of the present disclosure;

FIG. 32 illustrates an annular integral gasket for forming a flexible integral connection in accordance with another embodiment of the present disclosure;

FIG. 33 illustrates an annular integral gasket for forming a flexible integral connection in accordance with another embodiment of the present disclosure;

FIG. 34 illustrates an electro-fuse assembly constructed in accordance with one example embodiment of the present disclosure;

FIG. 35 illustrates an electro-fuse assembly constructed in accordance with another example embodiment of the present disclosure;

FIG. 40A is a sectional elevation view of the annular integral gasket of FIG. 39 seated in a channel portion of a first corrugated pipe spigot having a first end of the gasket fused to the spigot;

FIG. 40B is a perspective view of the annular integral gasket of FIGS. 39 and 40A seated in a channel portion of a first corrugated pipe spigot having a fusing arrangement disposed on an upper portion of the gasket;

FIG. 41 is a sectional elevation view of the annular integral gasket of FIG. 39 seated in a channel portion of a first corrugated pipe spigot having a fusing arrangement fused into an upper portion of the gasket;

DETAILED DESCRIPTION

Figure 9:
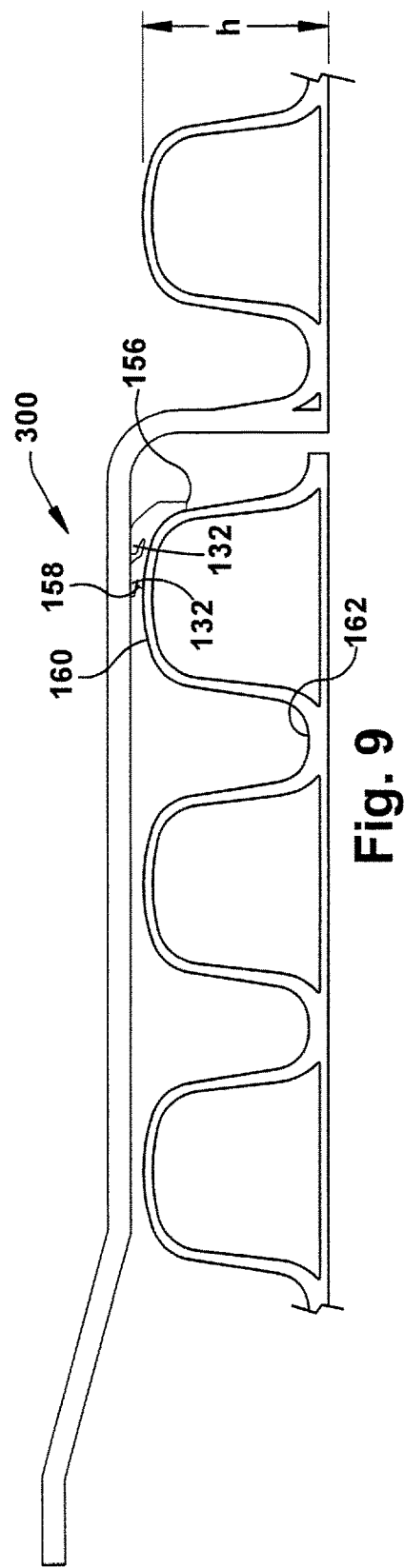
FIG. 9 is a partial sectional view illustrating the annular universal integral gasket embodiment of FIG. 2 fused a crown portion of a first corrugated pipe spigot received in a bell portion of a second corrugated pipe deformed as a result of forming a fluid-tight seal assembly of one example embodiment of the present disclosure.

The present disclosure relates to a gasket and method of attaching the gasket to a mating pipe, adjoining pipe, or both to form an integral connection therebetween such that a fluid-tight assembly is formed between the gasket, the mating pipe, and adjoining pipe. The integral connection between the one or more pipe members and gasket is formed independently or simultaneously to either or both pipe members. The integral connection between pipe members advantageously provides a flexible joint between the pipes since in several example embodiments (discussed below) a flexible portion of the gasket is left unintegrally formed about two gasket ends integrally formed with the pipes. The flexible portion of the gasket located between pipe members is provided with the freedom to move, providing a continuous fluid-tight seal during installation and operation.

Referring now to the figures and in particular to FIG. 1 is a cross-sectional view of annular conforming integral gasket 10 constructed in accordance with one example embodiment of the present disclosure. The conforming gasket 10 provides a fluid-tight seal 300 between a first tubular member 12 and second tubular member 14 illustrated in FIGS. 4-6. In the illustrated example embodiment, the first tubular member 12 has a plurality of annular grooves 16 and annular crowns 18 and the second tubular member 14 includes a smooth annular section 20, such as a bell with a mouth 22 for receiving the first tubular member 12. The first and second tubular members 12 and 14 could extend several feet (not shown), but are sectioned in the illustrated figures at point X. Once the fluid-tight connection is made between the annular conforming integral gasket 10 and tubular members 12, 14, fluids travel along the internal passage indicated by arrows L without leaking or entry of foreign objects or liquids.

The cross-sectional view of FIG. 1 of the annular conforming integral gasket 10 is typically circularly joined by welding two ends of the gasket together to form a continuous gasket constructed to a specified diameter as a function of the gasket application. In the illustrated embodiment, the inner diameter of the integral gasket 10 is slightly smaller than the smallest outer diameter profile of tubular member 12 to provide an interference type compression fit. Further discussion of the process of welding ends of linear elastomeric gaskets to form the annular gaskets is found in U.S. Patent Publication Number 2007/0181654 filed Aug. 9, 2007 and assigned to SPRINGSEAL® (Streetsboro, Ohio) (hereinafter "the '654 Publication") entitled FLASHLESS WELDING METHOD AND APPARATUS, which is incorporated herein by reference in its entirety. In some applications, the diameters of the first and second tubular members 12, 14 could be five or more feet in diameter, requiring an equivalent sized diameter of the annular gasket 10 to be used for that application.

In an alternative embodiment, the integral gasket 10 is formed from a linear extrudate supplied to the outer diameter of the tubular member 12 from a reel. The ends of the extrudate are cut on a bias, for example 45 degrees and fused to form a continuous or annular gasket during the fusing process discussed in further detail below.

In exemplary embodiment illustrated in FIG. 1, the conforming gasket 10 is formed from four different materials separated into a body region 30, sealing portion 32, lubricated portion 34, and bonding layer 36. The body region 30 is made from a first material 40 having a relatively hard durometer. An example of a suitable material would be an elastomeric material having a durometer range for the body region 30 between 60 and 80 durometer on a Shore A scale. Although elastomeric materials have been discussed, various polymers or rubbers having a durometer between 60 and 80 on a Shore A scale could also be used as a suitable first material without departing from the spirit and scope of the claimed invention.

The sealing portion 32 is made from a second material 42 having a relatively pliable durometer relative to the first material 40. An example of a suitable material would be an elastomeric material having a durometer range for the sealing portion between 40 and 60 durometer on a Shore A scale. An example of such material includes ASTM F477 Low Head material (ASTM F477 LH) which has a durometer of 50 plus or minus five. One company that makes ASTM F477 LH material is Advanced Elastomer Systems L.P. located in Akron, Ohio under their brand name SANTOPRENE®. Advanced Elastomer Systems' part number for SANTOPRENE® is 101-55. Multibase, a Dow Corning Company also produces ASTM F477 LH material under the part number 5904LC. Although elastomeric materials have been discussed, various polymers or rubbers having a durometer between 40 and 60 on a Shore A scale could also be used as a suitable second material without departing from the spirit and scope of the claimed invention.

The conforming gasket 10 includes a leading side 50 and a trailing side 52. Extending along a portion of the leading side 50 is a third material 44 that forms a portion of the conforming gasket 10. The third material 44 comprises a permanently lubricated composition. The permanently lubricated material 44 could be made from any material having a low coefficient of friction "COF" and more specifically a level of point five (0.5) or less. An example of such suitable material for the lubricated material 44 includes polyethylene or polypropylene which has an approximate COF of point three (0.3). The lubricated material 44 is relatively thin, having a thickness range between 0.001" to 0.010" inches, preferably ranging between 0.003" to 0.005" inches thick, and is typically applied along a substantial portion of the leading side 50 that would be in contact with the second tubular member during assembly. The lubricated material 44 can be extruded onto the gasket simultaneously with the first and second materials, eliminating a need for a secondary operation for applying lubrication to the gasket. Further discussions relating to the application of a permanently lubricated material to a gasket is found in the '905 Patent.

In an alternative embodiment, the third material and/or second material are molded to the body region 30 of the first material 40. Further discussion relating to the molding of a lubricated film and differing durometer materials into an elastomeric gasket can be found in U.S. Patent Publication Number 2007/0290455 filed Dec. 7, 2005 and entitled MOLDED GASKET AND METHOD OF MAKING (hereinafter "the '455 Publication"), which is incorporated herein by reference in its entirety. In yet another exemplary embodiment, the third material 44 is sprayed onto the leading side 50 of the sealing member 32. An example of a suitable sprayed lubricant includes poly(tetrafluoroethylene) or poly(tetrafluoroethene) (PTFE).

Located along a substantial portion of the trailing side 52 is the bonding layer 36 of the conforming integral gasket 10 that forms an integral bond by any one or combination of the fusion processes to be discussed below with either the first or second tubular members 12 and 14, respectively. The bonding layer 36 is made from a fourth material 46 that is suitable for forming a bond with the material forming the tubular members 12, 14. In one example embodiment, the fourth material 46 is the same composition as the tubular member 12 or 14 in which the integral bond is formed by the fusion process. In another example embodiment, the fourth material is a thermoplastic material. Such suitable examples for the fourth material include, polyethylene, polyvinylchloride (PVC), polypropylene, and the like.

In one exemplary embodiment the fourth material 46 provides for stretching such that the integral gasket can be elastically deformed from 1 to 20% of its overall size in order to stretch over the outer diameter of the first tubular member 12. In the illustrated example embodiment, the fourth material 46 is annularly shape in the integral gasket 10 and has a thickness between 0.010 and 0.015" inches. The bonded layer 36 that is fabricated from the fourth material 46 can be formed in or on the surface of the body region 30 by the co-extruding the materials or co-molding the material as described by the processes in the '905 Patent or the '455 Publication, respectively.

In another exemplary embodiment, any combination of the first, second, third, and fourth materials 40, 42, 44, and 46, respectively are extruded, co-extruded, tri-extruded, or quad-extruded simultaneously through an extrusion die head as could be understood by one skilled in the art in combination with the teachings of the '905 Patent. Illustrated is yet another example embodiment of the annular conforming integral gasket 10 that includes a fusion section 38 formed by a fifth material 48 that is embedded in the gasket body region 30 on the trailing side 52 on or near the bonding layer 36 fourth material 46 as depicted in FIG. 1A. The fusion section 38, as further discussed below facilitates in one example embodiment, the process of fusing the conforming gasket 10 to the tubular member 12, 14. In the illustrated example embodiment, the fifth material 48 is any electrically conductive material suitable for heat, resistive welding, or conductive welding (hereinafter "electro-fusing" or "electro-fusion welding" to form a fused bond). An example of a suitable fifth material 48 includes an annular copper insert approximately 0.005" to 0.010" inches thick. The fifth material 48 can also be simultaneously extruded or molded with any combination of first through fourth materials, 40, 42, 44, and 46, respectively.

In another alternative example embodiment, the annular conforming integral gasket 10 is a dual material gasket, fabricated from only the second material 42 and the fourth material 46, comprising a configuration of FIG. 1 yet having only the bonding layer of 36 of the fourth material while the rest of the configuration of the gasket 10, including the body region 30 and sealing portion 32 are formed from the second material 42. The dual material gasket example embodiment can be formed by co-extruding or co-molding the second and fourth materials 42, 46, respectively.

In yet another alternative example embodiment, the dual material gasket described above further comprises the third material 44 as the lubricated portion 34 along the leading side 50 of the sealing portion 32 as illustrated in FIG. 1 to form a tri-material gasket. The tri-material gasket example embodiment can be formed by tri-extruding or tri-molding the second, third, and fourth materials, 42, 44, and 46, respectively.

Also in another example alternative embodiment, the tri-material gasket described above further comprises the fifth material 48 fusion section 38 as illustrated in FIG. 1A to form a quad-material gasket. The quad-material gasket example embodiment can be formed by quad-extruding or quad-molding the second, third, fourth, and fifth materials, 42, 44, 46, and 48 respectively. In yet another example embodiment, the quad-material gasket described above could be constructed in such configuration without the second material 42 and lubricated portion 32, resulting in another alternative example embodiment of a tri-material gasket. Such tri-material gasket alternative example embodiment can be formed by tri-extruding or tri-molding the third, fourth, and fifth materials, 44, 46, and 48, respectively.

Returning again to FIGS. 1 and 1A, the annular conforming integral gasket 10 further comprises a forming edge 54 along the trailing side 52 that in combination with the first material 40 used in the body region 30 that facilitates adapting the gasket and bonding layer 36 to the contour of the annular grooves 16 through the crown 18 formed in the tubular member 12. The forming edge 54 extends from a trough end 56 up through a ridge end 58 and assists in positioning the integral gasket 10 during the fusion or bonding process to the tubular member 12.

Located at the ridge end 58 is a support member 60. The support member 60 engulfs a portion of the crown 18 and includes portions of both the body region 30 formed from the first material 40 and bonding layer 36 near the trailing side formed from the fourth material 46. The annular conforming integral gasket 10 further comprises a flexing member 62 located at the ridge end 58 of the gasket and is separated by an undercut 64 that provides flexibility to the flexing member 62 without influencing movement of the support member 60. To further assist in forming a sealing connection between the tubular members 12, 14 and the integral gasket 10, the flexing member 62 comprises a plurality of ribs 66 located along the leading side 50. The flexing member 62, undercut 64, and ribs 66 are formed from the second material 42. Located along the outer perimeter of the flexing member 62 and ribs 66 on the leading side 50 is the lubricated portion 34 formed from the third material 44. The lubricated portion as discussed above is secured to the flexing member 62 and ribs 66 by extruding, co-extruding, molding, or spraying the lubrication onto or into the leading side 50 of the gasket 10.

To reduce cost in forming the integral gasket 10, annular voids 68 are formed in insignificant areas of the body region 30 that reduce the total amount of material to form the gasket. In the illustrated example embodiments of FIGS. 1 and 1A, two voids 68 are shown, but could include more or less without departing from the spirit and scope of the claimed invention.

FIG. 2 illustrates a cross sectional view of an annular universal integral gasket 100 constructed in accordance with one example embodiment of the present disclosure. The universal gasket 100 provides a fluid-tight seal 300 between the first tubular member 12 and second tubular member 14 illustrated in FIGS. 7-9. In the illustrated example embodiment of FIG. 7, the first tubular member 12 has a plurality of annular grooves 16 and annular crowns 18 and the second tubular member 14 includes a smooth annular section 20, such as a bell with a mouth 22 for receiving the first tubular member 12. The first and second tubular members 12 and 14 could extend several feet (not shown), but are sectioned in the illustrated figures at point X. Once the fluid-tight connection is made between the annular universal integral gasket 100 and tubular members 12, 14, fluids travel along the internal passage indicated by arrows L without leaking or entry of foreign objects or liquids.

The cross-sectional view of FIG. 2 of the annular universal integral gasket 100 is typically circularly joined by welding two ends of the gasket together to form a continuous gasket formed to a specified diameter as a function of the application. In the illustrated embodiment, the inner diameter of the integral gasket 100 is slightly smaller than the smallest outer diameter profile of tubular member 12 to provide an interference type compression fit. Further discussion of the process of welding ends of linear elastomeric gaskets to form the annular gaskets is found in the aforementioned '654 Publication. In some applications, the diameters of the first and second tubular members 12, 14, could be five or more feet in diameter, requiring an equivalent sized diameter of the annular gasket 100 to be used for that application.

In an alternative embodiment, the integral gasket 100 is formed from a linear extrudate supplied to the outer diameter of the tubular member 12 from a reel. The ends of the extrudate are cut on a bias, for example 45 degrees and fused to form a continuous or annular gasket during the fusing process discussed in further detail below.

In exemplary embodiment illustrated in FIG. 2, the universal gasket 100 is formed from four different materials separated into a body region 130, first and second sealing members 132A and 132B, respectively, first and second lubricated portion 134A and 134B, respectively, and bonding layer 136. The body region 130 is made from a first material 140 having a relatively hard durometer. An example of a suitable material would be an elastomeric material having a durometer range for the body region 130 between 60 and 80 durometer on a Shore A scale. Although elastomeric materials have been discussed, various polymers or rubbers having a durometer between 60 and 80 on a Shore A scale could also be used as a suitable first material without departing from the spirit and scope of the claimed invention.

The sealing members 132A and 132B are made from a second material 142 having a relatively pliable durometer relative to the first material 140. An example of a suitable material would be an elastomeric material having a durometer range for the sealing portion between 40 and 60 durometer on a Shore A scale. An example of such material includes ASTM F477 Low Head material (ASTM F477 LH) which has a durometer of 50 plus or minus five. Although elastomeric materials have been discussed, various polymers or rubbers having a durometer between 40 and 60 on a Shore A scale could also be used as a suitable second material without departing from the spirit and scope of the claimed invention.

The annular universal annular gasket 100 includes a leading side 150 and a trailing side 152. Extending along a portion of the leading side 150 is a third material 144 that forms a portion of the universal integral gasket 100. The third material 144 comprises a permanently lubricated composition 134A/134B. The permanently lubricated material 144 could be made from any material having a low coefficient of friction "COF" and more specifically a level of point five (0.5) or less. An example of such suitable material for the lubricated material 144 includes polyethylene or polypropylene which has an approximate COF of point three (0.3). The lubricated material 144 is relatively thin, having a thickness range between 0.001" to 0.010" inches, preferably ranging between 0.003" to 0.005" inches thick, and is typically applied along a substantial portion of the leading side 150 that would be in contact with the second tubular member 14 during assembly. The lubricated material 144 can be extruded onto the gasket 100 simultaneously with the first and second materials, eliminating a need for a secondary operation for applying lubrication to the gasket. Further discussions relating to the application of a permanently lubricated material to a gasket is found in the '905 Patent.

In an alternative embodiment, the third material 144 and/or second material 142 are molded to the body region 130 of the first material 140. Further discussion relating to the molding of a lubricated film and differing durometer materials into an elastomeric gasket can be found in the aforementioned '455 Publication. In yet another exemplary embodiment, the third material 144 is sprayed onto the leading side 150 of the sealing members 132. An example of a suitable sprayed lubricant includes poly(tetrafluoroethylene) or poly(tetrafluoroethene) (PTFE).

Located along a substantial portion of the trailing side 152 is the bonding layer 136 of the annular universal integral gasket 100 that forms an integral bond by anyone or combination of the fusion processes to be discussed below with either the first or second tubular members 12 and 14, respectively. The bonding layer 136 is made from a fourth material 146 that is suitable for forming a bond with the material forming the tubular members 12, 14. In one example embodiment, the fourth material 146 is the same composition as the tubular member 12 or 14 in which the integral bond is formed by the fusion process. In another example embodiment, the fourth material is a thermoplastic material. Such suitable examples for the fourth material include, polyethylene, polyvinylchloride (PVC), polypropylene, and the like.

In one exemplary embodiment the fourth material 146 provides for stretching such that the integral gasket can be elastically deformed from 1 to 20% of its overall size in order to stretch over the outer diameter of the first tubular member 12. In the illustrated example embodiment, the fourth material 146 is annularly shape in the integral gasket 100 and has a thickness between 0.010 and 0.015" inches. The bonded layer 136 that is fabricated from the fourth material 146 can be formed in or on the surface of the body region 130 by the co-extruding the materials or co-molding the material as described by the processes in the '905 Patent or the '455 Publication, respectively.

In another exemplary embodiment, any combination of the first, second, third, and fourth materials 140, 142, 144, and 146, respectively are extruded, co-extruded, tri-extruded, or quad-extruded simultaneously through an extrusion die head as could be understood by one skilled in the art in combination with the teachings of the '905 Patent. Illustrated is yet another example embodiment of the annular universal integral gasket 100 that includes a fusion section 138 formed by a fifth material 148 that is embedded in the gasket body region 130 on the trailing side 152 on or near the bonding layer 136 fourth material 146, as depicted in FIG. 2A. The fusion section 138, as further discussed below facilitates in one example embodiment the process of fusing the universal integral gasket 100 to the tubular member 12, 14. In the illustrated example embodiment, the fifth material 148 is any electrically conductive material suitable for heat or conductive welding. An example of a suitable fifth material 148 includes an annular copper insert approximately 0.005" to 0.010" inches thick. The fifth material 148 can also be simultaneously extruded or molded with any combination of first through fourth materials, 140, 142, 144, and 146, respectively.

In another alternative example embodiment, the annular conforming integral gasket 100 is a dual material gasket, fabricated from only the second material 142 and the fourth material 146, comprising a configuration of FIG. 2 yet having only the bonding layer of 136 of the fourth material while the rest of the configuration of the gasket 100, including the body region 130 and sealing portion 132 are formed from the second material 142. The dual material gasket example embodiment can be formed by co-extruding or co-molding the second and fourth materials 142, 146, respectively.

In yet another alternative example embodiment, the dual material gasket described above further comprises the third material 144 as the lubricated portion 134 along the leading side 150 of the sealing portion 132 as illustrated in FIG. 2 to form a tri-material gasket. The tri-material gasket example embodiment can be formed by tri-extruding or tri-molding the second, third, and fourth materials, 142, 144, and 146, respectively.

Also in another example alternative embodiment, the tri-material gasket described above further comprises the fifth material, the 148 fusion section 138 as illustrated in FIG. 2A to form a quad-material gasket. The quad-material gasket example embodiment can be formed by quad-extruding or quad-molding the second, third, fourth, and fifth materials, 142, 144, 146, and 148 respectively. In yet another example embodiment, the quad-material gasket described above could be constructed in such configuration without the second material 142 and lubricated portion 132, resulting in another alternative example embodiment of a tri-material gasket. Such tri-material gasket alternative example embodiment can be formed by tri-extruding or tri-molding the third, fourth, and fifth materials, 144, 146, and 148, respectively.

Returning again to FIGS. 2 and 2A, the annular universal integral gasket 100 further comprises a forming edge 154 along the trailing side 152 that in combination with the first material 140 used in the body region 130 that facilitates adapting the gasket and bonding layer 136 to the contour of the annular grooves 16 through the crown 18 formed in the tubular member 12. The forming edge 154 extends from a leading edge 156 of the crown 18 up through a top portion 158 of the ridge 160 (See FIG. 9) and assists in positioning the universal integral gasket 100 during the fusion or bonding process to the tubular member 12. The annular universal integral gasket 100 is capable of attaching to any corrugation profile because the leading edge 156 is independent in length, that is, it is not required to extend along or attached at the bottom 162 of the annular groove 16 of the first tubular member 12. Stated another way, the annular universal integral gasket 100 will attached to any tubular member independent of the corrugation height represented by reference character "h" (See FIG. 9).

Located at a ridge end 163 of the universal gasket 100 is a support member 164. The support member 164 engulfs a portion of the crown 18 and includes portions of both the body region 130 formed from the first material 140 and bonding layer 136 near the trailing side 152 formed from the fourth material 146. The annular universal integral gasket 100 further comprises flexible sealing members 132A and 132B located and extending along the leading side 150 of the gasket and are separated by a void 168 that provides flexibility to the sealing members 132A and 132B without influencing movement of the support member 164 and independent movement between the sealing members. The sealing members 132A and 132B are formed from the second material 142.

Located along the outer perimeter of the flexible sealing members 132A and 132B on the leading side 150 is the lubricated portion 134 formed from the third material 144. The lubricated portion 134, as discussed above is secured to the flexible sealing members 132A and 132B by extruding, co-extruding, molding, or spraying the lubrication onto or into the leading side 150 of the gasket 100.

FIG. 3 illustrates a cross sectional view of an annular universal integral gasket 200 constructed in accordance with another embodiment of the present disclosure. The universal gasket 200 provides a fluid-tight seal 300 between the first tubular member 12 and second tubular member 14 illustrated in FIGS. 10-12. In the illustrated example embodiment of FIG. 10, the first tubular member 12 has a plurality of annular grooves 16 and annular crowns 18 and the second tubular member 14 includes a smooth annular section 20, such as a bell with a mouth 22 for receiving the first tubular member 12. The first and second tubular members 12 and 14 could extend several feet (not shown), but are sectioned in the illustrated figures at point X. Once the fluid-tight connection is made between the annular universal integral gasket 200 and tubular members 12, 14, fluids travel along the internal passage indicated by arrows L without leaking or entry of foreign objects or liquids.

The cross-sectional view of FIG. 3 of the annular universal integral gasket 200 is typically circularly joined by welding two ends of the gasket together to form a continuous gasket formed to a specified diameter as a function of the application. In the illustrated embodiment, the outer diameter of the integral gasket 200 is slightly larger than the smallest inner diameter of tubular member 14 to provide an interference type fit. Further discussion of the process of welding ends of linear elastomeric gaskets to form the annular gaskets is found in the aforementioned '654 Publication. In some applications, the diameters of the first and second tubular members 12, 14, could be five or more feet in diameter, requiring an equivalent sized diameter of the annular gasket 200 to be used for that application.

In an alternative embodiment, the integral gasket 200 is formed from a linear extrudate supplied to the inner diameter of the tubular member 14 from a reel. The ends of the extrudate are cut on a bias, for example 45 degrees and fused to form a continuous or annular gasket during the fusing process discussed in further detail below.

In exemplary embodiment illustrated in FIG. 3, the universal gasket 200 is formed from four different materials separated into a body region 230, first and second sealing members 232A and 232B, respectively, first and second lubricated portion 234A and 234B, respectively, and bonding layer 236. The body region 230 is made from a first material 240 having a relatively hard durometer. An example of a suitable material would be an elastomeric material having a durometer range for the body region 230 between 60 and 80 durometer on a Shore A scale. Although elastomeric materials have been discussed, various polymers or rubbers having a durometer between 60 and 80 on a Shore A scale could also be used as a suitable first material without departing from the spirit and scope of the claimed invention.

The sealing members 232A and 232B are made from a second material 242 having a relatively pliable durometer relative to the first material 240. An example of a suitable material would be an elastomeric material having a durometer range for the sealing portion between 40 and 60 durometer on a Shore A scale. An example of such material includes ASTM F477 Low Head material (ASTM F477 LH) which has a durometer of 50 plus or minus five. Although elastomeric materials have been discussed, various polymers or rubbers having a durometer between 40 and 60 on a Shore A scale could also be used as a suitable second material without departing from the spirit and scope of the claimed invention.

The annular universal annular gasket 200 includes a leading side 250 and a trailing side 252. Extending along a portion of the leading side 250 is a third material 244 that forms a portion of the universal integral gasket 200. The third material 244 comprises a permanently lubricated composition. The permanently lubricated material 244 could be made from any material having a low coefficient of friction "COF" and more specifically a level of point five (0.5) or less. An example of such suitable material for the lubricated material 244 includes polyethylene or polypropylene which has an approximate COF of point three (0.3). The lubricated material 244 is relatively thin, having a thickness range between 0.001" to 0.010" inches, preferably ranging between 0.003" to 0.005" inches thick, and is typically applied along a substantial portion of the leading side 250 that would be in contact with the first tubular member 12 during assembly. The lubricated material 244 can be extruded onto the gasket 200 simultaneously with the first and second materials, eliminating a need for a secondary operation for applying lubrication to the gasket. Further discussions relating to the application of a permanently lubricated material to a gasket is found in the '905 Patent.

In an alternative embodiment, the third material 244 and/or second material 242 are molded to the body region 230 of the first material 240. Further discussion relating to the molding of a lubricated film and differing durometer materials into an elastomeric gasket can be found in the aforementioned '455 Publication. In yet another exemplary embodiment, the third material 244 is sprayed onto the leading side 250 of the sealing members 232. An example of a suitable sprayed lubricant includes poly(tetrafluoroethylene) or poly(tetrafluoroethene) (PTFE).

Located along a substantial portion of an attachment end 260 opposite a sealing end 262 of the integral gasket 200 is the bonding layer 236 that forms an integral bond by anyone or combination of the fusion processes to be discussed below with the second tubular member 14. The bonding layer 236 is made from a fourth material 246 that is suitable for forming a bond with the material forming the tubular member 14. In one example embodiment, the fourth material 246 is the same composition as the tubular member 14 in which the integral bond is formed by the fusion process. In another example embodiment, the fourth material is a thermoplastic material. Such suitable examples for the fourth material include, polyethylene, polyvinylchloride (PVC), polypropylene, and the like.

In one exemplary embodiment the fourth material 246 provides for stretching such that the integral gasket can be elastically deformed from 1 to 20% of its overall size in order to stretch during fusing to the internal diameter "ID" of the bell 20 of the second tubular member 14. In the illustrated example embodiment, the fourth material 246 is annularly shape in the integral gasket 200 and has a thickness between 0.010 and 0.015" inches. The bonded layer 236 that is fabricated from the fourth material 246 can be formed in or on the surface of the body region 230 by the co-extruding the materials or co-molding the material as described by the processes in the '905 Patent or the '455 Publication, respectively.

In another exemplary embodiment, any combination of the first, second, third, and fourth materials 240, 242, 244, and 246, respectively are extruded, co-extruded, tri-extruded, or quad-extruded simultaneously through an extrusion die head as could be understood by one skilled in the art in combination with the teachings of the '905 Patent. Illustrated is yet another example embodiment of the annular universal integral gasket 200 that includes a fusion section 238 formed by a fifth material 248 that is embedded in the gasket body region 230 along the attachment end 260 on or near the bonding layer 236 fourth material 246, as depicted in FIG. 3A. The fusion section 238, as further discussed below facilitates in one example embodiment the process of fusing the universal integral gasket 200 to the inner diameter ID of tubular member 14. In the illustrated example embodiment, the fifth material 248 is any electrically conductive material suitable for heat or conductive welding. An example of a suitable fifth material 248 includes an annular copper insert approximately 0.005" to 0.010" inches thick. The fifth material 248 can also be simultaneously extruded or molded with any combination of first through fourth materials, 240, 242, 244, and 246, respectively.

In another alternative example embodiment, the annular conforming integral gasket 200 is a dual material gasket, fabricated from only the second material 242 and the fourth material 246, comprising a configuration of FIG. 3 yet having only the bonding layer of 236 of the fourth material while the rest of the configuration of the gasket 200, including the body region 230 and sealing portion 232 are formed from the second material 242. The dual material gasket example embodiment can be formed by co-extruding or co-molding the second and fourth materials 242, 246, respectively.

In yet another alternative example embodiment, the dual material gasket described above further comprises the third material 244 as the lubricated portion 234 along the leading side 250 of the sealing portion 232 as illustrated in FIG. 3 to form a tri-material gasket. The tri-material gasket example embodiment can be formed by tri-extruding or tri-molding the second, third, and fourth materials, 242, 244, and 246, respectively.

Also in another example alternative embodiment, the tri-material gasket described above further comprises the fifth material 248 fusion section 238 as illustrated in FIG. 3A to form a quad-material gasket. The quad-material gasket example embodiment can be formed by quad-extruding or quad-molding the second, third, fourth, and fifth materials, 242, 244, 246, and 248 respectively. In yet another example embodiment, the quad-material gasket described above could be constructed in such configuration without the second material 242 and lubricated portion 234, resulting in another alternative example embodiment of a tri-material gasket. Such tri-material gasket alternative example embodiment can be formed by tri-extruding or tri-molding the third, fourth, and fifth materials, 244, 246, and 248, respectively.

Located near the trailing side 252 about the attachment end 260 of the universal gasket 200 is a support lobe 264. The support lobe 264 includes both portions of the bonding layer and 236 formed from the fourth material 246 and body region 230 formed from the first material 240. The annular universal integral gasket 200 further comprises flexible sealing members 232A and 232B located and extending along the sealing end 262 of the gasket and are separated by a void 262 that provides flexibility to the sealing members 232A and 232B without influencing movement of the support lobe 264 and independent movement between the sealing members. The flexible sealing members 232A and 232B are formed from the second material 242.

Located along the outer perimeter of the flexible sealing members 232A and 232B on the leading side 250 are the first and second lubricated portion 234A and 234B, respectively formed from the third material 244. The lubricated portion 234, as discussed above is secured to the flexible sealing members 232A and 232B by extruding, co-extruding, molding, or spraying the lubrication onto or into the leading side 250 of the gasket 200.

The lubricating portions 34, 134, and 234 formed from the third material 44, 144, 244 reduces the COF between the first and second tubular members 12, 14, respectively during the interconnecting of the members. Another advantage of the locating only a select amount of lubrication strategically positioned along the sealing portions 32, 132, and 232 is that after the pipe is assembled, the non-lubricated trailing side of the sealing portions acts as a lock, gripping the pipe, thereby resisting separation between the first and second tubular members. In yet an alternative exemplary embodiment, the integral gasket 10, 100, 200 is formed without a lubricated portion or third material 44, 144, 244. Such application may be desired when the connection between the first tubular member 12 and second tubular member 14 is achieved mechanically.

Figure 12:
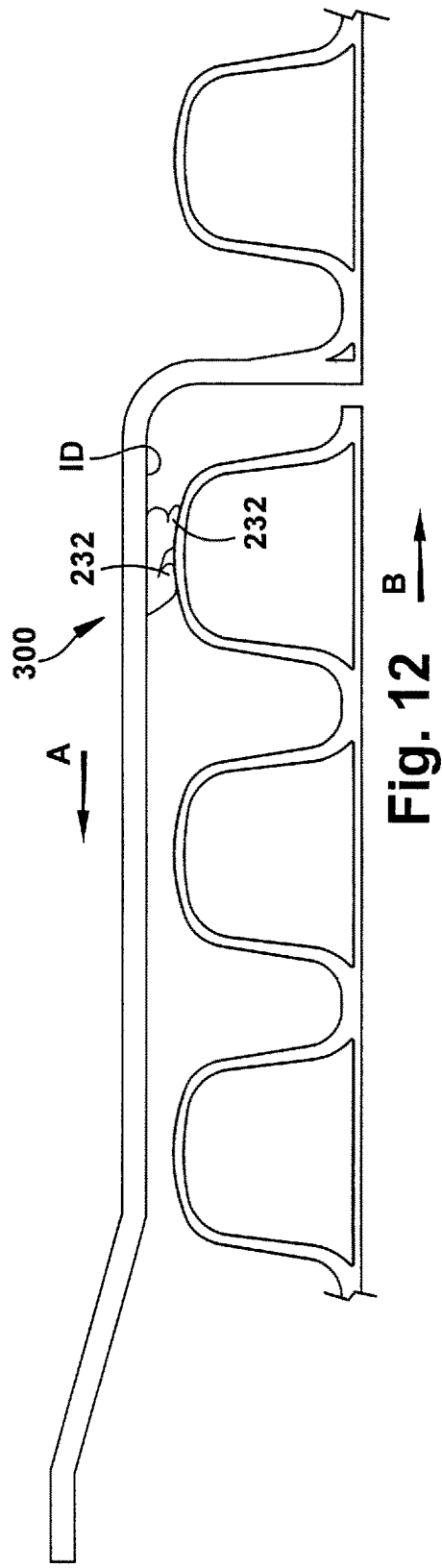
FIG. 12 is a partial sectional view illustrating the annular universal integral gasket embodiment of FIG. 3 fused an inner diameter of a first corrugated pipe's bell that is receiving a spigot portion of a second corrugated pipe, the gasket being deformed as a result of forming a fluid-tight seal assembly of one example embodiment of the present disclosure.

Referring to FIGS. 4, 7, and 10, the integral gasket 10, 100, 200 seals a gap "G" between the first tubular member 12 and the smooth annular section of the bell 20 when the first tubular member and smooth section of the second tubular member 14 are in a relative surrounded and surrounding relationship. FIGS. 6, 9, and 12 illustrate the contact between the sealing members 32, 132, and 232 and corresponding tubular member during assembly, as the deformation of the sealing members are shown in phantom when a fluid-tight sealing assembly 300 is formed. A magnified view of the fluid-tight assembly 300 is further depicted in FIGS. 5B, 8B, and 11B, as the sealing members 32, 132, 232 are deformed along the direction of arrow C when the tubular members 12, 14 are assembled. In particular, the first tubular member 12 is advanced during assembly along the direction of arrow A while the second tubular member 14 is advanced along the direction of arrow B to form an interference engagement of the integral gasket 10, 100, 200 located therebetween (see FIGS. 5B, 8B, and 11B).

The fluid-tight sealing assembly 300 illustrated in the example embodiment of FIGS. 5A and 5B is achieved as the sealing member 32 of the annular conforming integral gasket 10 is deformed by the engagement of the inner diameter 302 of the second tubular member 14. The fluid-tight sealing assembly 300 illustrated in the example embodiment of FIGS. 8A and 8B is achieved as the sealing member 132 of the annular universal integral gasket 100 is deformed by the engagement of the inner diameter 302 of the second tubular member 14. The fluid-tight sealing assembly 300 illustrated in the example embodiment of FIGS. 11A and 11B is achieved as the sealing member 232 of the annular universal integral gasket 200 is deformed by the engagement of the outer diameter 304 of the first tubular member 12.

In the illustrated example embodiments of FIGS. 4, 7, and 10 the first and second tubular members 12, 14 are corrugated pipes that include annular grooves 16 and crowns 18. It should be readily apparent that the inventive annular universal integral gaskets 100, and 200 could be used on any type of pipe with or without corrugations. For example, the annular universal integral gaskets 100, and 200 could be used with PVC pipe, corrugated metal pipe, corrugated plastic pipe, fiberglass pipe, or cast iron pipe. Further it should be readily apparent that the outer pipe could include corrugations while the end of the inner pipe is smooth. For example, the integral gaskets 10, 100, and 200 could be used to form a PVC bell and spigot joint.

Attachment of the Integral Gaskets to its Respective Tubular Member

By fusing the annular integral gaskets 10, 100, and 200 to its respective tubular member 12 or 14, the present disclosure advantageously avoids several short comings in conventional sealing assemblies that require a seat in the tubular member and almost press-fit insertion of a corresponding anchor portion in the gasket. The gasket anchor portion in the gasket requires special equipment to position the anchor in the seat of the tubular member during the manufacturing process of the pipe. The example embodiments of the present disclosure provides annular integral gaskets 10, 100, and 200 that allow the manufacturer of the tubular members to form the pipe at standard lengths with standard pipe making molds without the requirement of any special seat in the tubular members.

In addition, conventional tubular pipe and gasket assemblies provide a gasket seat that attracts dirt and debris between the gasket and the gasket seat. This increases the chances for a leak path for the fluid being contained in the pipe or from fluids external entering the pipe. Fusing the integral gasket 10, 100, and 200 to one of the tubular members substantially eliminates the possibility of debris entering between the tubular pipe members.

Furthermore, the fusion of the integral gasket 10, 100, 200 to the respective tubular member allows for the placement of the integral gasket at locations on the attaching pipe that will maximize the gasket force placed between the tubular members 12, 14 and the integral gasket. This creates a more reliable fluid-tight seal assembly, preventing common problems in conventional gasket/pipe assemblies where the gasket has a tendency to roll-out of the seat, as a result of the assembly forces being high. For thermoplastic pipe materials, the coefficient of friction is relatively low, thereby requiring high compression forces on the gasket in order to achieve a sealing connection that in turn provokes a roll-out condition in conventional assemblies. When the gaskets roll-out of the seat, the chances for leaks and entry of undesirable debris is heightened. Fusing the integral gasket 10, 100, 200 to a respective tubular member precludes rolling of the gasket experienced in conventional assemblies.

Conventional pipe assemblies required the gasket to be stretched over the outer diameter of the inner pipe to create a circumferential compressive force for holding the gasket in place. This stretching of the conventional gasket creates undesirable tensile strain in the gasket cross section. The tensile strain in the gasket may shorten the life expectancy of the gasket. Additionally, this tensile strain acts negatively on the welded connection between the two ends that form the conventional annular gasket. The integral gasket of the present disclosure does not rely on the circumferential compression force on the exterior of the pipe, thereby mitigating any tensile stresses in the integral gaskets 10, 100, 200, increasing its life expectancy over that of traditional gaskets.

Finally, conventional pipe assembly gaskets are known to be fabricated with stiffing rings within the gasket to ensure the gasket will stay in the gasket seat. Since the integral gaskets 10, 100, 200 of the present disclosure will be bonded to the respective tubular member 12 or 14 to make certain the integral gasket remains in position. As a result, the integral gasket 10, 100, 200 will provide a more economical gasket compared to existing technologies.

By providing the integral gaskets 10, 100, 200 with a bonding layer 36, 136, 236 that is compatible with the base material of the tubular member 12 or 14 to which the integral gasket is to be attached, fusing between the integral gasket and tubular member can be achieved. As a result, many different fusing techniques can be employed. Some suitable fusing techniques include spin or friction welding, chemical or solvent welding ultrasonic welding, resistance welding, and extrusion welding.

Examples of suitable solvents for solvent welding include those solvents commercially known for use with PVC applications. An example of a suitable chemical for chemical welding includes Scotch-Weld™ DP8005 Acrylic Adhesive manufactured by the Adhesive Division 3M® Corporation of St. Paul, Minn.

In the illustrated example embodiment of FIGS. 1A, 2A, and 3A an annular fusion section 38, 138, 238 is inserted near the bonding layer 36, 136, 236. Applying power to the fusion section made from a conductive fifth material 48, 148, and 248 generates resistance heat and melts or welds the bonding layer ("electro-fusion") with and into the corresponding tubular section 12 or 14 in which the integral gasket 10, 100, 200 is to be attached.

Employing the spin or friction welding operation for fusing the integral gasket 10, 100, 200 to the corresponding tubular section 12 or 14, in one example embodiment the integral gasket is held stationary in a fixture while the attaching tubular member is spun, thereby generating friction and heat between the contacting gasket and pipe to form a fused connection. In an alternative example embodiment the tubular member 12 or 14 for attaching the integral gasket is held stationary in a fixture while the integral gasket 10, 100, 200 is spun, thereby generating friction and heat between the contacting gasket and pipe to form a fused connection.

Figure 13:
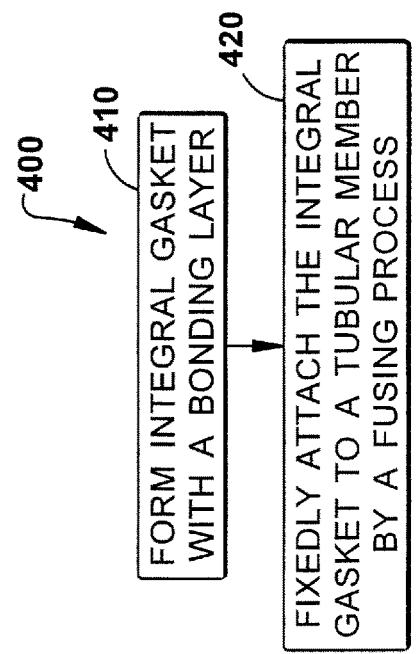
FIG. 13 is a flowchart of exemplary embodiment of the present disclosure illustrating a method of fusing an annular integral gasket to a pipe sections in accordance with one example embodiment of the present disclosure.

FIG. 13 is a flowchart of exemplary embodiment of the present disclosure illustrating a method 400 of fusing an annular integral gasket to a pipe sections in accordance with one example embodiment of the present disclosure. At 410, the method 400 comprises forming an integral gasket with a bonding layer. The forming method at 410 can be achieved by any of the processes described above, including co-extruding or co-molding the bonding layer with one or more different materials from the bonding material. At 420, the method 400 comprises fixedly attaching the integral gasket to a tubular member by a fusing process. The fusing process at 420 can comprise anyone or combination of the processes identified above, namely, spin or friction welding, chemical or solvent welding, ultrasonic welding, resistance welding, and extrusion welding.

FIG. 14 illustrates a cross sectional view of an annular universal integral gasket 500 constructed in accordance with one example embodiment of the present disclosure. The universal gasket 500 provides a fluid-tight seal between first tubular member 12 and second tubular member 14, as illustrated in FIG. 17. In particular, the integral gasket 500 is integrally attached to both first and second tubular members 12, 14, respectively. The integral attachment in the illustrated embodiment of FIGS. 14 and 17 is achieved by electro-fusing a first portion 502 of the gasket 500 to the first tubular member 12. Once the first portion 502 is fused to the first tubular member 12, the second tubular member 14 is positioned over the first tubular member (as shown by the direction of the arrows FIG. 19) and a second portion 504 of the gasket 500 is integrally attached to the second tubular member by a similar electro-fusing process, forming a fluid-tight connection between the two tubular members.

In one example embodiment, the first and second portions, 502 and 504 are constructed from the same composition as the material forming the tubular members 12 and 14 in which the integral bond is formed by the electro-fusion process. In another example embodiment, the first and second portions 502 and 504 are formed from a thermoplastic material. Such suitable examples for the thermoplastic material include, polyethylene, polyvinylchloride (PVC), polypropylene, and the like.

Returning again to FIG. 14, the integral gasket 500 includes a body portion 506 integrally formed by extruding or molding with first and second portions 502, 504. The body portion 506 is formed from a relatively pliable durometer first material 508. An example of a suitable first material 508 would be an elastomeric material having a durometer range between 40 and 60 durometer on a Shore A scale. An example of such material includes ASTM F477 Low Head material (ASTM F477 LH), which has a durometer of 50 plus or minus five. Although elastomeric materials have been discussed, various polymers or rubbers having a durometer between 40 and 60 on a Shore A scale could also be used as a suitable first material 508 without departing from the spirit and scope of the claimed invention.

The illustrated example embodiment of the annular universal integral gasket 500 includes a fusion section 510 formed by a second material 512 that is embedded at the intersection between the first and second portions 502, 504 and the body portion 506, as depicted in FIG. 14. The fusion section 510, as further discussed below facilitates in one example embodiment the process of fusing the universal integral gasket 500 to the tubular members 12, 14. In the illustrated example embodiment, the second material 512 is any electrically conductive material suitable for heat, resistance welding, or conductive welding. An example of a suitable second material 512 includes an annular copper insert approximately 0.005" to 0.010" inches thick. The 512 material can also be simultaneously extruded or molded with any combination of first material 508 and material forming first and second portions 502, 504. A suitable second material further includes a product entitled "Power Welding Rod" manufactured by Powercore International, Ltd. of Ottawa, Ontario Canada found on the Internet at www.powercore.com. The specification of the Power Welding Rod is incorporated herein by reference.

In an alternative embodiment, the electronic fusing process between the first and second portions 502, 504 and respective tubular members 12, 14 can occur simultaneously after the integral gasket 500 is positioned in a groove 16 or recess 520 (see FIG. 15B) located in a crown 18 and the corresponding tubular member is seated over the gasket (see direction of arrows FIG. 19). Once the tubular members surround the gasket 500, the second material is energized, thereby fusing first and second portions 502, 504 to their respective tubular member, as depicted in FIG. 17. This simultaneous fusing process can occur at the original equipment manufacturers facility or in the field by applying a portable power supply to energize the second material 512. In one example embodiment, the portable power supply is satisfactory with 6 amps or 45 W of power at 7 VDC.

FIG. 15A illustrates another example embodiment of the present disclosure, depicting a wedge integral gasket 550 having a bonding portion 552 and a main body 554. In the illustrated embodiment, the bonding portion 552 is the same composition as the tubular member 12 and 14 in which the integral bond is formed by a bonding process such as hot air melting, sonic welding, friction or spin welding, heat induction, infra-red heat melting, or chemical bonding. In another example embodiment, the bonding portion 552 is formed from a thermoplastic material. Such suitable examples for the thermoplastic material include, polyethylene, polyvinylchloride (PVC), polypropylene, and the like.

Illustrated in FIG. 15A, the integral gasket 550 includes the main body 554 integrally formed by extruding or molding with the bonding portion 552. The main body 554 is formed from a relatively pliable durometer first material 556. An example of a suitable first material 556 would be an elastomeric material having a durometer range between 40 and 60 durometer on a Shore A scale. An example of such material includes ASTM F477 Low Head material (ASTM F477 LH), which has a durometer of 50 plus or minus five. Although elastomeric materials have been discussed, various polymers or rubbers having a durometer between 40 and 60 on a Shore A scale could also be used as a suitable first material 556 without departing from the spirit and scope of the claimed invention.

FIG. 18B illustrates a bonding of the wedge gasket 550 with the first and second tubular members 12, 14. The wedge gasket 550 is first positioned (see FIG. 15A) into the recess 520 and integrally melded with first tubular member 12 by a bonding process, such as such as hot air melting, sonic welding, friction or spin welding, heat induction, infra-red heat melting, or chemical bonding. The second tubular member 14 is positioned (in the direction of the arrows in FIG. 18A) over the wedge gasket 550, and is integrally formed with bonding portion 552 of the wedge gasket by spin welding the outer tubular member 14 about the inner tubular member 12 or vice versa, forming a fluid-tight connection therebetween. In yet another alternative embodiment, the wedge gasket 550 is integrally formed with the first and second tubular members 12 and 14 by ultrasonic welding, hot air welding, chemically fusing, infra-red welding, or heat induction welding the bonding portion 552 with the corresponding tubular member 12 or 14 (illustrated in FIG. 18B).

In yet another illustrated embodiment of FIG. 20, the wedge gasket 550 or integral gasket 500 is positioned in a recess 600 located in the bell of a second tubular member 14 (and not a recess of a spigot or first tubular member 12). In the illustrated embodiment of FIG. 20, the integral gasket 500 or wedge gasket 550 is integrally welded or bonded to both tubular members 12 and 14 as discussed above to form a fluid-tight seal.

The cross-sectional views of FIGS. 14-20 of the annular universal integral gasket 500 and 550 is typically circularly joined by welding two ends of the gasket together to form a continuous gasket formed to a specified diameter as a function of the application.

In the illustrated embodiment of FIGS. 14-19, the inner diameter of the integral gasket 500 and 550 is slightly smaller than the smallest outer diameter profile of tubular member 12 to provide an interference type compression fit. Further discussion of the process of welding ends of linear elastomeric gaskets to form the annular gaskets is found in the aforementioned '654 Publication. In some applications, the diameters of the first and second tubular members 12, 14, could be five or more feet in diameter, requiring an equivalent sized diameter of the annular gasket 500 or 550 to be used for that application.

In an alternative embodiment, the integral gasket 500 or 550 is formed from a linear extrudate supplied to the outer diameter of the tubular member 12 from a reel. The ends of the extrudate are cut on a bias, for example 45 degrees and fused to form a continuous or annular gasket during the fusing process discussed in further detail below.

FIG. 21 is a flowchart of exemplary embodiment of the present disclosure illustrating a method 700 of fusing or bonding an annular integral gasket to pipe sections in accordance with one example embodiment of the present disclosure. At 710, an integral annular gasket (of any of the aforementioned gasket structures) or annular wedge integral gasket 550 is fused or bonded with one of a first or a second tubular member. At 720, the integral annular gasket or annular wedge integral gasket is fused or bonded with the other of the first or second tubular member. The bonding or fusing step at 720 is achieved by electro-fusion, hot air melting, sonic welding, friction or spin welding, heat induction, infra-red heat melting, resistance welding or chemical bonding.

FIG. 22 is a flowchart of exemplary embodiment of the present disclosure illustrating a method of simultaneously fusing or bonding an annular integral gasket to pipe sections in accordance with one example embodiment of the present disclosure. At 810, an annular integral gasket (of any of the aforementioned gasket structures) or annular wedge integral gasket 550 is positioned between first and second tubular members. At 820, the annular integral gasket or annular wedge integral gasket is bonded or fused with the first and second tubular members simultaneously to form a fluid tight connection therebetween. The bonding or fusing step at 820 is achieved by the aforementioned electro-fusion process.

By fusing the annular integral gasket or annular wedge integral gasket in any of the prior example embodiments constructs, methods, or processes discussed above to the tubular members, a flexible annular connection 900 between the tubular members is formed. The flexible annular connection 900 is shown in yet another example embodiment in FIGS. 23-26 in which a thermoplastic elastomeric ("TPE") gasket 902 or similarly formed from any of the various materials or material combinations discussed above and also includes a second electro-fusion material 904 and 906, annularly located at opposite ends of the gasket. In the illustrated example embodiment, the second material 904, 906 is any electrically conductive material suitable for heat, resistance welding, electro-fusion, or conductive welding. An example of a suitable second material 904, 906 includes an annular copper insert approximately 0.005" to 0.010" inches thick. The second material 904, 906 can also be simultaneously extruded or molded with any combination of the material forming the gasket 902. An example of a suitable second material further includes a product entitled "Power Welding Rod" manufactured by Powercore International, Ltd. of Ottawa, Ontario Canada found on the Internet at www.powercore.com.

Figure 23:
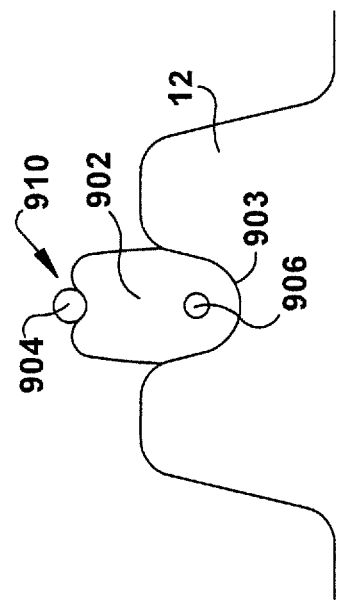
FIG. 23 is an annular integral gasket for forming a flexible integral connection in accordance with another embodiment of the present disclosure.
Figure 24:
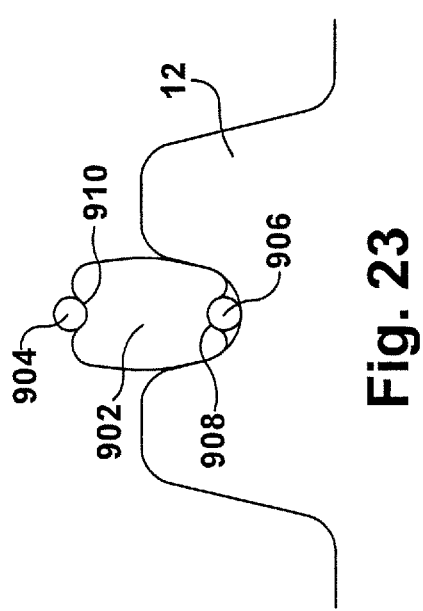
FIG. 24 is an annular integral gasket for forming a flexible integral connection in accordance with another embodiment of the present disclosure.
Figure 25:
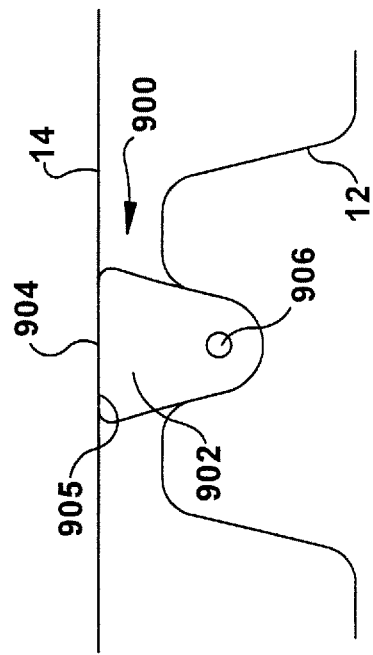
FIG. 25 is an annular integral gasket for forming a flexible integral connection in accordance with another embodiment of the present disclosure.
Figure 26:
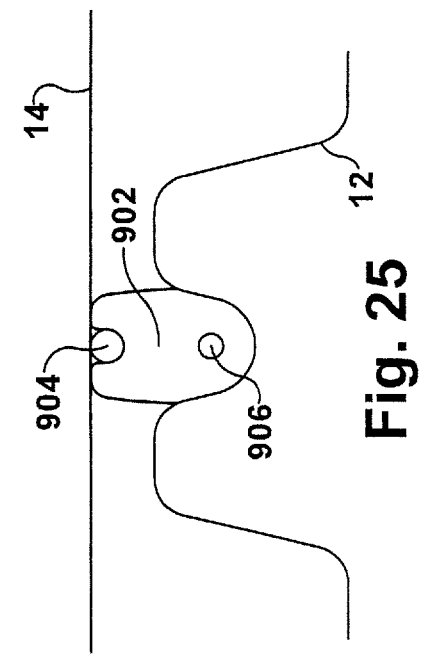
FIG. 26 is an annular integral gasket for forming a flexible integral connection in accordance with another embodiment of the present disclosure.

The annular integral gasket 902 is seated in tubular member 12 as shown in FIG. 23 and the second material 906 is located in an annular recess 908 and energized in FIG. 24 to form an integral connection 903 with tubular member 12. In FIG. 25, tubular member 14 is positioned over second material 904 and annular gasket 902. In FIG. 26, the second material 904 is positioned in an annular recess 910 and energized to form an integral connection 905 with tubular member 14 and a flexible annular connection 900 between the tubular members. As discussed above, the energizing of second materials 904 and 906 could also occur simultaneously once the tubular members are positioned over the annular gasket 902.

The flexible connection 900 formed between tubular members 12 and 14 or between sections of two tubular members 12 or two tubular members 14 will solve an existing problem of sealing misaligned pipe sections that exist because, for example: a sink hole is situated beneath a connection between tubular members in the field; grade alignment problems; differential settlement issues in the ground above and below the tubular members; and thermal expansions and contractions that occur because of climate changes during use and installation. The flexible connection 900 may allow for one-half of one inch (½") up to one inch (1") of linear misalignment along the longitudinal or lateral axis of the tubular members.

Illustrated in FIGS. 27-31 is yet another example embodiment employing an integral annular gasket 960 of the present disclosure. In the illustrated example embodiment, the annular integral gasket 960 forms a flexible connection 962 between first tubular member 12a and second tubular member 12b as shown in FIGS. 27 and 28. In the field or at the OEM, a cut is made in the second tubular member 12b at cut lines A-A and B-B in FIG. 28 transverse to the longitudinal axis X-X of the tubing. The gasket 960 is then positioned at the upper end 964 of the second tubular member 12b. The gasket 960 is formed from any of the materials described in the integral annular gaskets of the previous embodiments and is integrally formed with the second tubular member by any bonding or electro-fusing processes of any of the previous example embodiments.

For example, the gasket 960 could be formed to both first and second tubular members simultaneously by wires 966 in an electro fusion process or by an adhesive or welding process. In yet another embodiment, the gasket 960 is positioned over the upper end 964 of the second tubular member 12b then integrally formed with the second tubular member by bonding or electro-fusion. Once the bonding or fusion is complete, a ridge 968 of the first tubular member 12a is positioned under the upper end 964 of the second tubular member 12b. The gasket 960 is then fused by wires 966 or bonded to the first tubular member 12a as shown in FIG. 31 to form a flexible water-tight connection 962 between first and second tubular members.

The example embodiment of FIGS. 27-31 illustrate that such construction of the gasket and integral connection between two tubular or pipe members avoids the need for special end configurations such as a bell and spigot connections. Advantageously, the integral annular gasket of the present disclosure in any of the constructs described above, as can be appreciated by one skilled in the art would recognize the that a connection can now be made at any location of piping without the need for special ends (bell and/or spigot) and with a gasket providing a flexible connection allowing for a fluid tight flexible connection even with misalignment between tubular members or pipes.

FIG. 32 illustrates an annular integral gasket 1000 constructed in accordance with another example embodiment for forming a flexible integral connection 1004 between tubular members or pipes 1002a and 1002b. The annular gasket 1000 is formed from any of the combination of materials making up the gaskets in the aforementioned embodiments and includes a bonding region 1003 that is integrally formed with tubular members 1002a and 1002b at bonding zones 1006 and 1008 to form the flexible connection 1004. The bonding region could be the same material as that of the gasket 1000 or of different materials described in the embodiments above integrally compatible with the tubular members.

In one embodiment of FIG. 32, the flexible connection 1004 is formed by bonding the gasket to the tubular members by ultrasonic welding, hot air welding, chemically fusing, infra-red welding, or heat induction welding either simultaneously or to each tubular member at different times. In an alternative embodiment of FIG. 32, the connection 1004 is formed by electro-fusing the gasket 1000 to each tubular member 1002 either simultaneously or to each tubular member at different times by a second material 1010.

In the illustrated example embodiment of FIG. 32, the second material 1010 is any electrically conductive material suitable for heat or conductive welding. An example of a suitable second material 1010 includes an annular copper insert approximately 0.005" to 0.010" inches thick. The second material 1010 can also be simultaneously extruded or molded with any combination of the material forming the gasket 1000. An example of a suitable second material further includes a product entitled "Power Welding Rod" manufactured by Powercore International, Ltd. of Ottawa, Ontario Canada found on the Internet at www.powercore.com.

FIG. 33 illustrates an annular integral gasket 1020 for forming a flexible integral connection 1004 in accordance with another embodiment of the present disclosure similar to construction of the embodiment of FIG. 32 only differing by a hook 1022 in the gasket for securing the gasket from displacement as the first and second tubular members engage. In particular, as tubular member 1002a moves along in direction of arrow A or tubular member 1002b moves along in direction of arrow B or a simultaneous movement of both members along their respective directions occurs for engagement between tubular members. The annular hook 1022 retains the gasket 1020 in position around an annular end 1024 of one of the tubular members, and in the illustrated embodiment of FIG. 33 the annular end of tubular member 1002a.

FIG. 34 illustrates an electro-fuse assembly 1200 constructed in accordance with one example embodiment of the present disclosure forming a fluid-tight connection 300 between first and second tubular members 12 and 14, respectively. In the illustrated example embodiment of FIG. 34, the electro-fuse assembly 1200 is constructed solely of an electrical coil 1202 comprising several annular windings about the tubular members having a positive lead 1204 and negative lead 1206 to which energy or power is applied. Upon the application of power, heat is generated throughout the coil 1202 and the second and first tubular members are melted together to form a fluid-tight connection 300.

Illustrated in the example embodiment of FIG. 34, the coil 1202 is located on the exterior perimeter of the tubular member assembly formed by first and second tubular members 12, 14. This allows for easy access for the leads 1204 and 1206 to be connected to a remote power supply 1208 that can be used at an OEM or in the field. In another example embodiment, the coil 1202 is nested within a recess 1210 formed about the perimeter of the external or second tubular member.

In the illustrated example embodiment of FIG. 34, the coil 1202 is any electrically conductive material suitable for heat, resistance welding, or conductive welding. An example of a suitable coil 1202 includes an annular copper insert approximately 0.005" to 0.010" inches thick. A suitable coil material also includes a product entitled "Power Welding Rod" manufactured by Powercore International, Ltd. of Ottawa, Ontario Canada found on the Internet at www.powercore.com. The specification of the Power Welding Rod is incorporated herein by reference.

Referring now to FIG. 35 is an electro-fuse assembly 1250 constructed in accordance with another example embodiment of the present disclosure forming a fluid-tight connection 300 between first and second tubular members 12 and 14, respectively. In the illustrated example embodiment of FIG. 35, the electro-fuse assembly 1250 is constructed solely of an electrical coil 1252, comprising several windings about the tubular members having a positive lead 1254 and negative lead 1256 from which energy or power is applied. Upon the application of power, heat is generated throughout the coil 1250 and the second and first tubular members are melted together to form a fluid-tight connection 300.

Illustrated in the example embodiment of FIG. 35, the coil 1250 is located the exterior perimeter of the tubular member assembly formed by first and second tubular members 12, 14. This construct requires an opening 1258 through the second tubular member 14 for access to the positive lead 1254 by the remote power supply 1260. The remote power supply 1260 that can be used at an OEM or in the field. In another example embodiment, the coil 1250 is nested within a recess 1262 formed about the internal perimeter of the second tubular member 14. In another example embodiment, the hole 1258' is located toward the mouth 22 of the second tubular member 14, advantageously placing hole after the fluid-tight connection 300, however, requiring a cross-over 1264 in the leads 1254' and 1256.

In the illustrated example embodiment of FIG. 35, the coil 1250 is any electrically conductive material suitable for heat, resistance welding, or conductive welding. An example of a suitable coil 1250 includes an annular copper insert approximately 0.005" to 0.010" inches thick. In an alternative example embodiment, the electrically conductive material forming the coil 1250 is a soft and conductive material, such as conductive tape. The conductive tape 1250 accommodates for spacing in the crossover between the leads 1256 and 1254' and between the tubular members. A suitable coil material also includes a product entitled "Power Welding Rod" manufactured by Powercore International, Ltd. of Ottawa, Ontario Canada found on the Internet at www.powercore.com. The specification of the Power Welding Rod is incorporated herein by reference.

Figure 36:
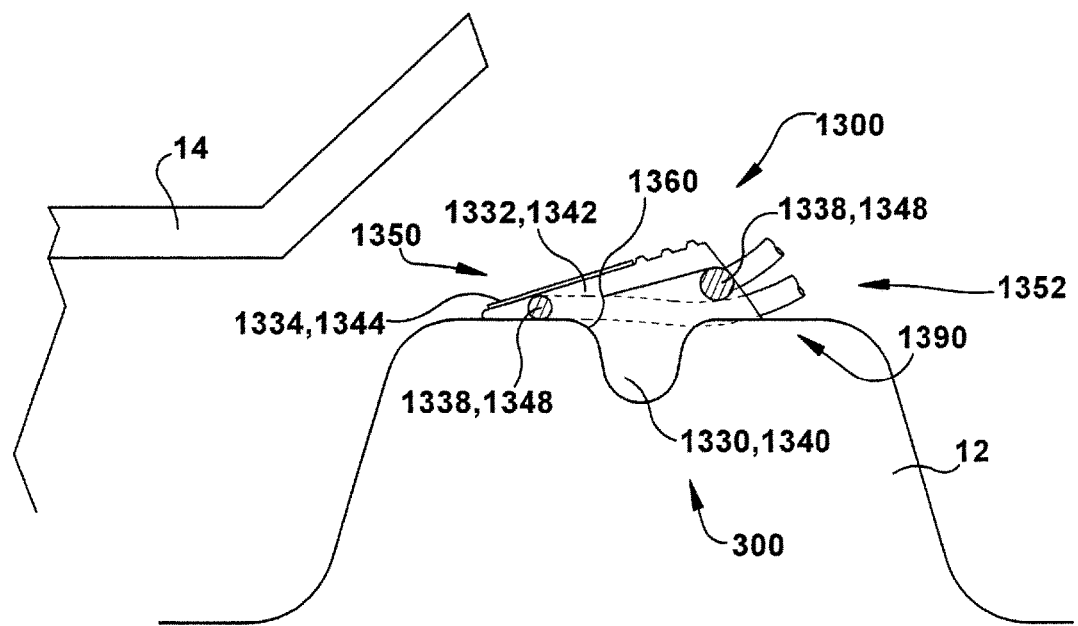
FIG. 36 illustrates an integral wedge gasket constructed in accordance with one example embodiment of the present disclosure.

FIG. 36 illustrates an integral wedge gasket 1300 constructed in accordance with one example embodiment of the present disclosure, forming a fluid-tight connection 300 between first and second tubular members 12 and 14, respectively. In exemplary embodiment illustrated in FIG. 36, the integral wedge gasket 1300 is formed from four different materials separated into a body region 1330, sealing portion 1332, lubricated portion 1334, and electro-fusing members 1338. The body region 1330 is made from a first material 1340 having a relatively hard durometer. An example of a suitable material would be an elastomeric material having a durometer range for the body region 1330 between 60 and 80 durometer on a Shore A scale. Although elastomeric materials have been discussed, various polymers or rubbers having a durometer between 60 and 80 on a Shore A scale could also be used as a suitable first material without departing from the spirit and scope of the claimed invention.

The sealing portion 1332 is made from a second material 1342 having a relatively pliable durometer relative to the first material 1340. An example of a suitable material would be an elastomeric material having a durometer range for the sealing portion between 40 and 60 durometer on a Shore A scale. An example of such material includes ASTM F477 Low Head material (ASTM F477 LH) which has a durometer of 50 plus or minus five. One company that makes ASTM F477 LH material is Advanced Elastomer Systems L.P. located in Akron, Ohio under their brand name SANTOPRENE®. Advanced Elastomer Systems' part number for SANTOPRENE® is 101-55. Multibase, a Dow Corning Company also produces ASTM F477 LH material under the part number 5904LC. Although elastomeric materials have been discussed, various polymers or rubbers having a durometer between 40 and 60 on a Shore A scale could also be used as a suitable second material without departing from the spirit and scope of the claimed invention.

The integral wedge gasket 1330 includes a leading side 1350 and a trailing side 1352. Extending along a portion of the leading side 1350 is a third material 1344 that forms a portion of the integral wedge gasket 1300. The third material 1344 comprises the permanently lubricated composition 1334. The permanently lubricated material 1344 could be made from any material having a low coefficient of friction "COF" and more specifically a level of point five (0.5) or less. An example of such suitable material for the lubricated material 1344 includes polyethylene or polypropylene which has an approximate COF of point three (0.3). The lubricated material 1344 is relatively thin, having a thickness range between 0.001" to 0.010" inches, preferably ranging between 0.003" to 0.005" inches thick, and is typically applied along a substantial portion of the leading side 1350 that would be in contact with the second tubular member 14 during assembly. The lubricated material 1344 can be extruded onto the gasket simultaneously with the first and second materials, eliminating a need for a secondary operation for applying lubrication to the gasket. Further discussions relating to the application of a permanently lubricated material to a gasket is found in the '905 Patent.

In an alternative embodiment, the third material and/or second material are molded to the body region 1330 of the first material 1340. Further discussion relating to the molding of a lubricated film and differing durometer materials into an elastomeric gasket can be found in U.S. Patent Publication Number 2007/0290455 filed Dec. 7, 2005 and entitled MOLDED GASKET AND METHOD OF MAKING (hereinafter "the '455 Publication"), which is incorporated herein by reference in its entirety. In yet another exemplary embodiment, the third material 1344 is sprayed onto the leading side 1350 of the sealing member 1332. An example of a suitable sprayed lubricant includes poly(tetrafluoroethylene) or poly(tetrafluoroethene) (PTFE).

Electro-fusing members 1338 formed by fourth material 1348 are embedded in the gasket body region 1330 on the trailing side 1352 and in the sealing portion 1332 on the leading side 1350. The electro-fusing members 1338, as further discussed below facilitates in one example embodiment, the process of electro-fusing the wedge integral gasket 1300 to the tubular members 12, 14. In the illustrated example embodiment, the fourth material 1348 is any electrically conductive material suitable for heat, resistive welding, or conductive welding (hereinafter "electro-fusing" or "electro-fusion welding" to form a fused bond). An example of a suitable fourth material 1348 includes an annular copper insert approximately 0.005" to 0.010" inches thick. The fourth material 1348 can also be simultaneously cross-head extruded, molded or added by a secondary operation with any combination of first through third materials, 1340, 1342, and 1344, respectively. In an alternative example embodiment, the fourth material 1348 is a soft and conductive material, such as conductive tape. The conductive tape formed by the fourth material 1348 accommodates for spacing in the crossover between the leads extending from the electro-fusing members 1338 and between the tubular members.

A flexible portion 1360 is located within said annular body 1330 and/or sealing portion 1332 provides a flexible annular connection between tubular members in the integral fluid-tight connection 300 such that the flexible portion allows both lateral and longitudinal independent movement of the tubular members 12, 14, In one exemplary embodiment the flexible portion 1360 provides for stretching such that the integral gasket can be elastically deformed from 1 to 20% of its overall size in order to stretch over the outer diameter of the first tubular member 12. In an alternative example embodiment, any combination of the body region 1330, sealing portion 1332, and/or flexible portion 1360 is made from a low density or polyethylene foam material.

Referring again to the illustrated example embodiment of FIG. 36, the electro-fusing members 1338 include a positive lead and negative lead to which energy or power is applied. In one example embodiment, the positive and negative lead form a single circuit that pass into both the leading 1350 and trailing 1352 sides of the gasket 1300. In another alternative example embodiment, the electro-fusing members 1338 on the leading 1350 and trailing 1352 sides of the gasket are independent circuits each having their own positive and negative leads that extend out the trailing end of the gasket. By having independent circuits formed from separate electro-fusing members 1338 (as shown in one embodiment of FIG. 36), the leading or trailing ends can be fused at different times through the application of power to the members.

Upon the application of power, heat is generated throughout the electro-fusing members 1338 and the second and first tubular members are melted together to form a fluid-tight connection 300. In the illustrated example embodiment, the electro-fusing member 1338 on the leading side 1350 after annularly surrounding the gasket 1300 to an entry position, exit in the same direction that it entered the gasket, namely through the trailing edge 1352 as shown in phantom in area 1390. The electro-fusing member 1338 on the trailing side 1352 also enters and exits the gasket 1330 from the trailing side at area 1390, as shown in FIG. 36. This eliminates any need for adding an exit or entry opening in the tubular members for connecting the electro-fusing member to its remote power source 1392. In one example embodiment, the trailing and leading sides 1350, 1352, respectively, include independent circuits formed from separate electro-fusing members 1338 (with independent coils if multiple windings are required), each having electro-fusing circuit having its own positive and negative leads. As a result, one side of the gasket 1300 such as the leading side 1350 can be fused at the plant, factory or OEM through the electro-fusing member 1338 located in the leading side, while the other side, in this example trailing side 1352 can be fused in the field by its respective electro-fusing member or members.

Figure 37:
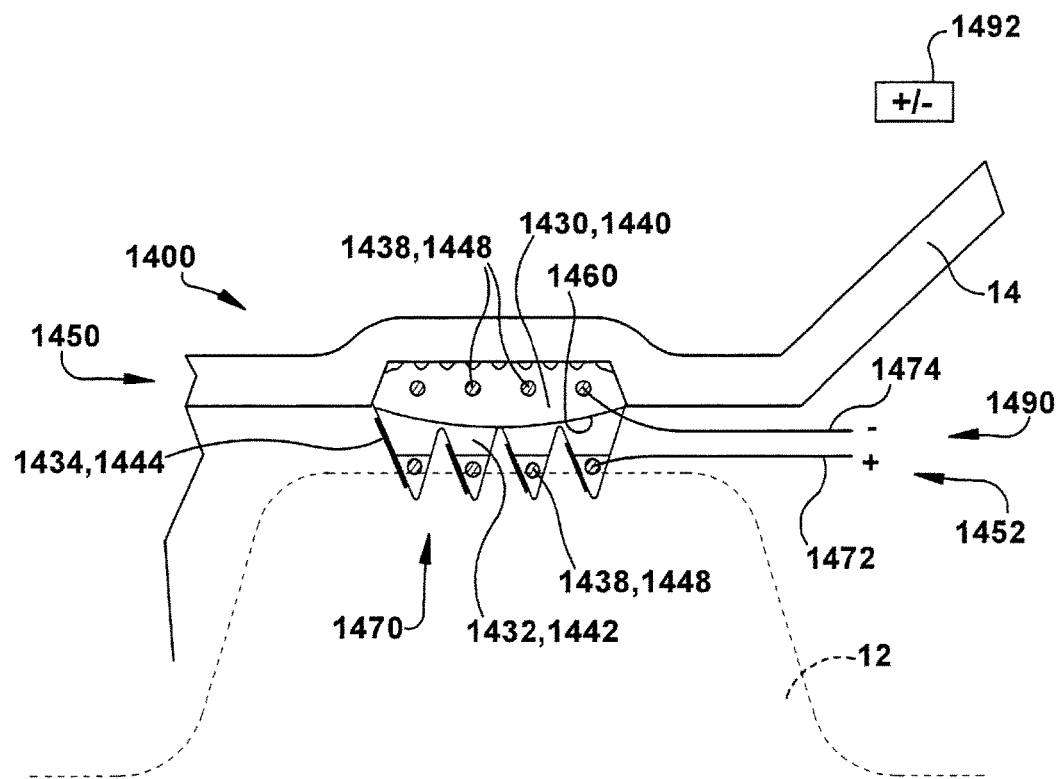
FIG. 37 illustrates integral ribbed gasket constructed in accordance with one example embodiment of present disclosure.
Figure 38:
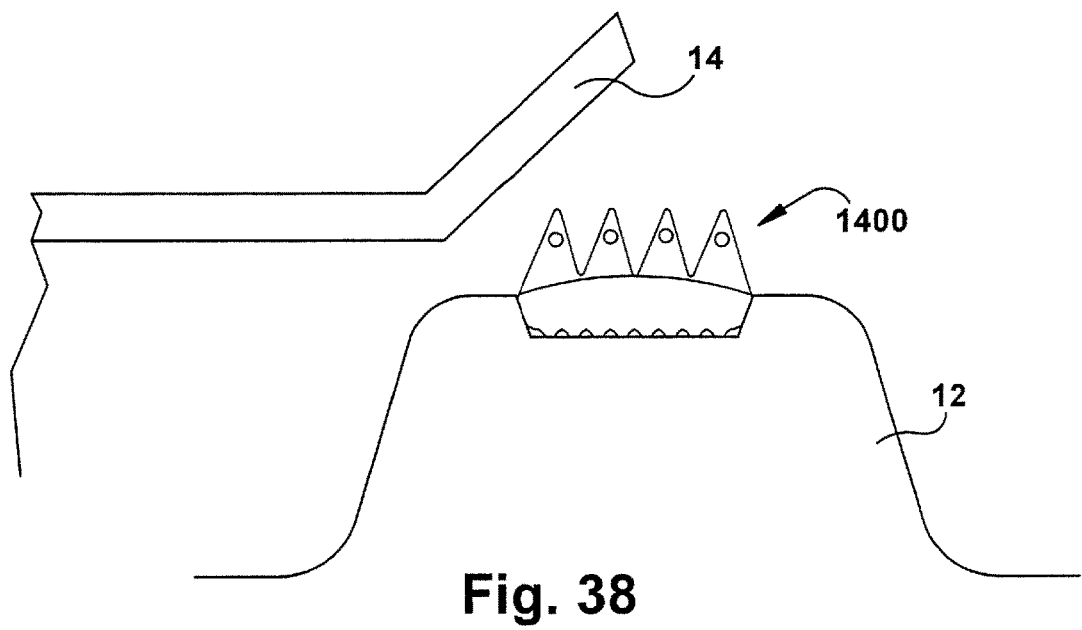
FIG. 38 is the integral ribbed gasket of FIG. 37.

FIGS. 37 and 38 illustrate an integral ribbed gasket 1400 constructed in accordance with one example embodiment of present disclosure forming a fluid-tight connection 300 between first and second tubular members 12 and 14, respectively. In exemplary embodiment illustrated in FIG. 37, the integral ribbed gasket 1400 is formed from four different materials separated into a body region 1430, sealing portion 1432, lubricated portion 1434, and electro-fusing members 1438. The body region 1430 is made from a first material 1440 having a relatively hard durometer. An example of a suitable material would be an elastomeric material having a durometer range for the body region 1430 between 60 and 80 durometer on a Shore A scale. Although elastomeric materials have been discussed, various polymers or rubbers having a durometer between 60 and 80 on a Shore A scale could also be used as a suitable first material without departing from the spirit and scope of the claimed invention.

The sealing portion 1432 is made from a second material 1442 having a relatively pliable durometer relative to the first material 1440. An example of a suitable material would be an elastomeric material having a durometer range for the sealing portion between 40 and 60 durometer on a Shore A scale. An example of such material includes ASTM F477 Low Head material (ASTM F477 LH) which has a durometer of 50 plus or minus five. One company that makes ASTM F477 LH material is Advanced Elastomer Systems L.P. located in Akron, Ohio under their brand name SANTOPRENE®. Advanced Elastomer Systems' part number for SANTOPRENE® is 101-55. Multibase, a Dow Corning Company also produces ASTM F477 LH material under the part number 5904LC. Although elastomeric materials have been discussed, various polymers or rubbers having a durometer between 40 and 60 on a Shore A scale could also be used as a suitable second material without departing from the spirit and scope of the claimed invention.

The integral ribbed gasket 1400 includes a leading side 1450 and a trailing side 1452. Extending along a portion of the leading side 1450 is a third material 1444 that forms a portion of the integral ribbed gasket 1400. The third material 1444 comprises a permanently lubricated composition 1434. The permanently lubricated material 1444 could be made from any material having a low coefficient of friction "COF" and more specifically a level of point five (0.5) or less. An example of such suitable material for the lubricated material 1444 includes polyethylene or polypropylene which has an approximate COF of point three (0.3). The lubricated material 1444 is relatively thin, having a thickness range between 0.001" to 0.010" inches, preferably ranging between 0.003" to 0.005" inches thick, and is typically applied along a substantial portion of the leading side 1450 that would be in contact with the second tubular member 14 during assembly. The lubricated material 1444 can be extruded onto the gasket simultaneously with the first and second materials, eliminating a need for a secondary operation for applying lubrication to the gasket. Further discussions relating to the application of a permanently lubricated material to a gasket is found in the '905 Patent.

In an alternative embodiment, the third material and/or second material are molded to the body region 1430 of the first material 1440. Further discussion relating to the molding of a lubricated film and differing durometer materials into an elastomeric gasket can be found in U.S. Patent Publication Number 2007/0290455 filed Dec. 7, 2005 and entitled MOLDED GASKET AND METHOD OF MAKING (hereinafter "the '455 Publication"), which is incorporated herein by reference in its entirety. In yet another exemplary embodiment, the third material 1444 is sprayed onto the leading side 1450 of the sealing member 1432. An example of a suitable sprayed lubricant includes poly(tetrafluoroethylene) or poly(tetrafluoroethene) (PTFE).

Electro-fusing members 1438 formed by fourth material 1448 are embedded in the gasket body region 1430 and in the sealing portion 1432. The electro-fusing members 1438, as further discussed below facilitates in one example embodiment, the process of electro-fusing the integral ribbed gasket 1400 to the tubular members 12, 14. In the illustrated example embodiment, the fourth material 1448 is any electrically conductive material suitable for heat, resistive welding, or conductive welding (hereinafter "electro-fusing" or "electro-fusion welding" to form a fused bond). An example of a suitable fourth material 1448 includes an annular copper insert approximately 0.005" to 0.010" inches thick. The fourth material 1448 can also be simultaneously cross-head extruded, molded or added by a secondary operation with any combination of first through third materials, 1440, 1442, and 1444, respectively. In an alternative example embodiment, the fourth material 1448 is a soft and conductive material, such as conductive tape. The conductive tape formed by the fourth material 1448 accommodates for spacing in the crossover between the leads extending from the electro-fusing members 1438 and between the tubular members. In yet another example embodiment, the fourth material 1448 is a bare wire extruded into the gasket or is a pre-manufactured cord or "Power Welding Rod" manufactured by Powercore extruded into the gasket. Alternatively, in another example embodiment, the fourth material 1448 is bare wire positioned or placed into the gasket after the gasket is formed or a pre-manufactured cord or "Power Welding Rod" manufactured by Powercore subsequently positioned into the gasket after the gasket is formed.

A flexible portion 1460 is located within said annular body 1430 and/or sealing portion 1432 provides a flexible annular connection between tubular members in the integral fluid-tight connection 300 such that the flexible portion allows both lateral and longitudinal independent movement of the tubular members 12, 14, In one exemplary embodiment the flexible portion 1460 provides for stretching such that the integral gasket can be elastically deformed from 1 to 20% of its overall size in order to stretch over the outer diameter of the first tubular member 12.

Referring again to the illustrated example embodiment of FIG. 37, the electro-fusing members 1438 include plurality of coils 1470 that include a positive lead 1472 and a negative lead 1474 to which energy or power is applied. Upon the application of power, heat is generated throughout the electro-fusing members 1438 and the second and first tubular members are melted together to form a fluid-tight connection 300. In the illustrated example embodiment, the electro-fusing member's 1438 positive or negative leads 1474, 1472 after surrounding the gasket 1400 to an entry position, exit in the same direction that it entered the gasket, namely through the trailing edge 1452 as shown in area 1490. This eliminates any need for adding an exit or entry opening in the tubular members for connecting the electro-fusing member to its remote power source 1492. In an alternative embodiment, the electro-fusing members 1438 in the sealing members 1432 have a positive and negative lead separate and independent from electro-fusing members 1438 located in the body region 1430.

Figure 39:
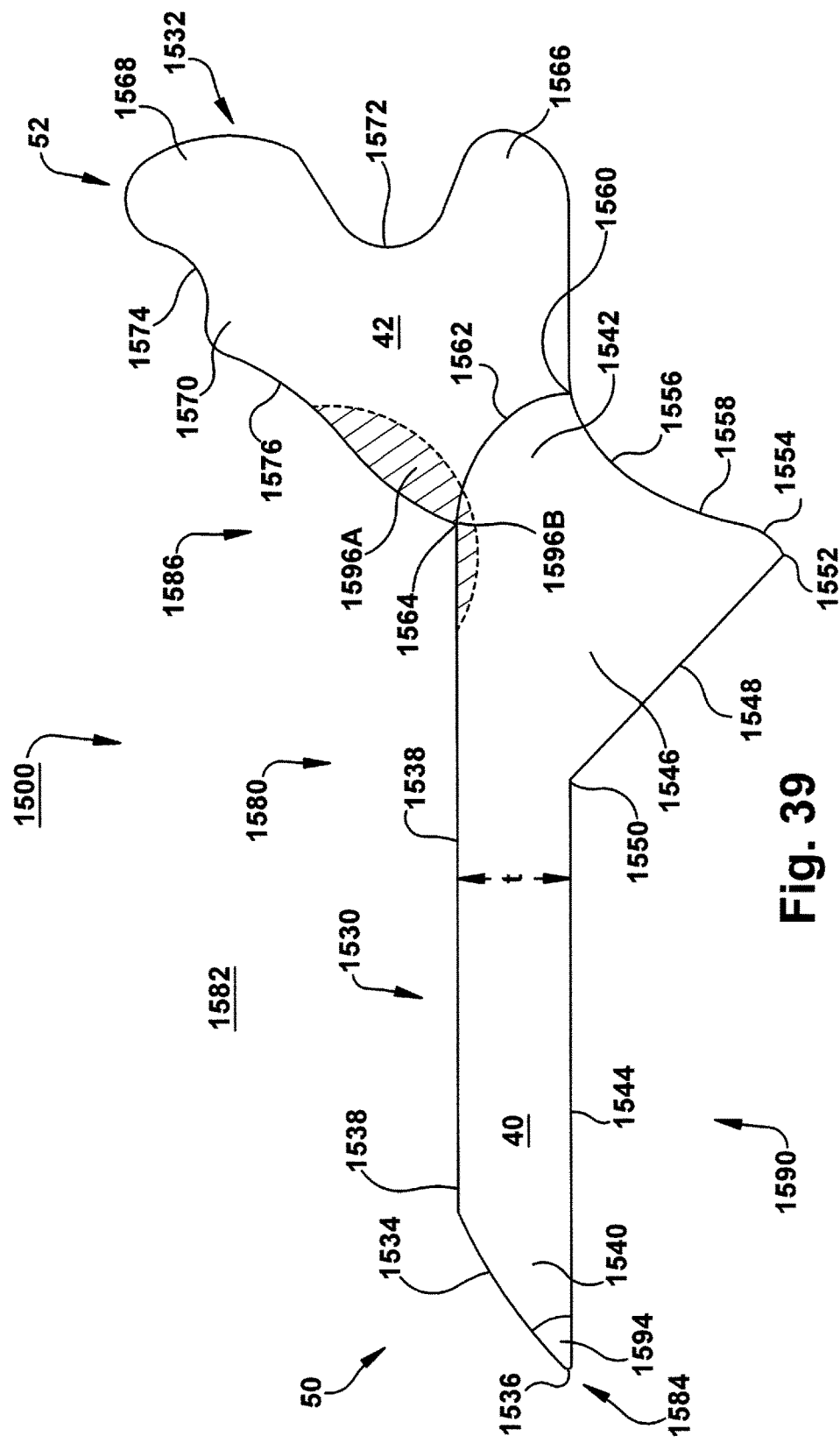
FIG. 39 is a partial cross-sectional view of an annular integral gasket for forming a flexible integral hinge-like connection in accordance with another embodiment of the present disclosure.

FIG. 39 illustrates an annular integral gasket 1500 that provides a flexible integral hinge-like connection between two tubular pipe members to form a sealing connection in accordance with another embodiment of the present disclosure. In particular, FIG. 39 illustrates a cross-sectional view of the annular integral hinge gasket 1500 constructed in accordance with one example embodiment.

The cross-sectional view of FIG. 39 of the annular integral hinge gasket 1500 is typically circularly joined by welding two ends of the gasket together to form a continuous gasket constructed to a specified diameter as a function of the gasket application. Further discussion of the process of welding ends of linear elastomeric gaskets to form the annular gaskets is found in U.S. Pat. No. 7,503,992 that issued on Mar. 17, 2009 and is assigned to SPRINGSEAL® (Streetsboro, Ohio) (hereinafter "the '992 Patent") entitled FLASHLESS WELDING METHOD AND APPARATUS, which is incorporated herein by reference in its entirety. In some applications, the diameters of the first and second tubular members 12, 14 could be five or more feet in diameter, requiring an equivalent sized diameter of the annular gasket 1500 to be used for that application.

In exemplary embodiment illustrated in FIG. 39, the integral hinge gasket 1500 is formed from two different materials separated into a body region 1530 and a sealing portion 1532. The body region 1530 is made from a first material 40 having a relatively hard and rigid durometer. An example of a suitable material would be a rigid plastic material having a durometer range for the body region 1530 between 40 and 50 durometer on a Shore D scale. Polymers such as polyethylene or polypropylene having a durometer between 40 and 50 on a Shore D scale could also be used as a suitable first material 40 without departing from the spirit and scope of the claimed invention.

The sealing portion 1532 is made from a second material 42 having a relatively pliable durometer relative to the first material 40. An example of a suitable material would be an elastomeric material having a durometer range for the sealing portion between 40 and 60 durometer on a Shore A scale. An example of such material includes ASTM F477 Low Head material (ASTM F477 LH), which has a durometer of 50 plus or minus five. One company that makes ASTM F477 LH material is Advanced Elastomer Systems L.P. located in Akron, Ohio under their brand name SANTOPRENE®. Advanced Elastomer Systems' part number for SANTOPRENE® is 101-55. Multibase, a Dow Corning Company also produces ASTM F477 LH material under the part number 5904LC. Another suitable example material is a styrene based theremoplastic such as styrene ethylene butylenes elastomer, also sold under part number SEBS TPE 55A. Although elastomeric materials have been discussed, various polymers or rubbers having a durometer between 40 and 60 on a Shore A scale could also be used as a suitable second material without departing from the spirit and scope of the claimed invention.

Figure 39A:
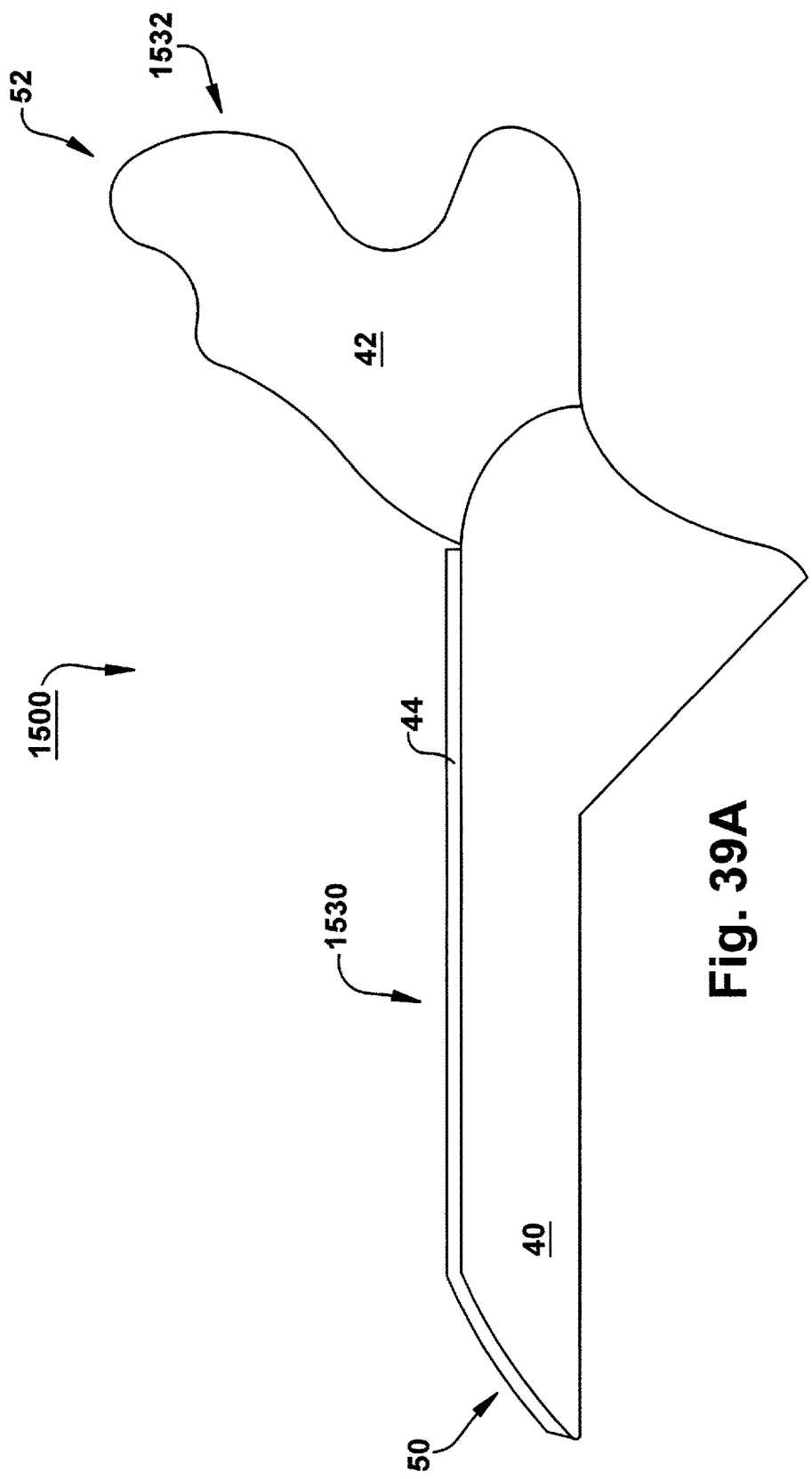
FIG. 39A is a partial cross-sectional view of an annular integral gasket for forming a flexible integral hinge-like connection in accordance with another embodiment of the present disclosure.

The integral hinge gasket 1500 includes a leading side 50 and a trailing side 52. In an alternative example embodiment of FIG. 39A, a third material 44 is used and extends along a portion of the leading side 50. The third material 44 comprises a permanently lubricated composition. The permanently lubricated material 44 could be made from any material having a low coefficient of friction "COF" and more specifically a level of point five (0.5) or less. An example of such suitable material for the lubricated material 44 includes polyethylene or polypropylene which has an approximate COF of point three (0.3). The lubricated material 44 is relatively thin, having a thickness range between 0.001" to 0.010" inches, preferably ranging between 0.003" to 0.005" inches thick, and is typically applied along a substantial portion of the leading side 50 that would be in contact with the second tubular member during assembly. The lubricated material 44 can be extruded onto the gasket simultaneously with the first 40 and second 42 materials, eliminating a need for a secondary operation for applying lubrication to the gasket. Further discussions relating to the application of a permanently lubricated material to a gasket is found in the '905 Patent.

In an alternative embodiment, the third material 44 (of FIG. 39A) and/or second material 42 are molded to the body region 1530 of the first material 40. Further discussion relating to the molding of a lubricated film and differing durometer materials into an elastomeric gasket can be found in U.S. Pat. No. 7,731,884 that issued on Jun. 8, 2010 and entitled MOLDED GASKET AND METHOD OF MAKING (hereinafter "the '884 Patent"), which is incorporated herein by reference in its entirety. In yet another exemplary embodiment, the third material 44 is sprayed onto the leading side 50 of the sealing member 1532. An example of a suitable sprayed lubricant includes poly(tetrafluoroethylene) or poly(tetrafluoroethene) ("PTFE").

Referring again to the example embodiment of FIG. 39, the body member 1530 comprises an inclined surface 1534 located between an apex 1536 diverging to an upper plane 1538 that extends from a first end 1540 to a second end 1542 of the body member. The inclined surface 1534 divides spatially the upper plane 1538 from a lower plane 1544. The upper and lower planes 1538, 1544 are substantially parallel and maintain an equal distance annularly about a radial axis of the gasket 1500.

The lower plane 1544 of the body member 1530 extends linearly from the apex 1536 directly to a shoulder portion 1546. The shoulder portion 1546 of the body member 1530 comprises a wedged surface 1548 originating at a termination point 1550 of the lower plane 1544. The wedged surface 1548 descends in a substantially linear fashion from the termination point 1550 away from the lower plane 1544 until reaching a radial apex 1552. The radial apex 1552 forms the radial-most inner region of the shoulder portion 1546 and annular gasket 1500. Longitudinally extending along the body member 1530, a relatively uniform thickness is formed from the leading side 50 starting at the origin of the upper plane 1538 toward the trailing side 52 until reaching the termination point 1550. The relatively uniform thickness is represented in FIG. 39 by reference character "t".

Rising along a curvilinear path formed by first and second arcs 1554 and 1556, respectively, is a shoulder back 1558 of the shoulder portion 1546. The first arc 1554 is generally convex relative to the shoulder portion 1546, while the second arc 1556 is relatively concave to the same. The curvilinear path of shoulder back 1558 of the shoulder portion 1546 ends at an intersection 1560 of the sealing member 1532 and body member 1530. The second end 1542 of the body member 1530 further comprises an arcuate surface 1562 that starts at an end 1564 of the upper plane 1538 and continues to until reaching the intersection 1560.

The arcuate surface 1562 defines the boundary between body member 1530 and sealing member 1532 in the illustrated example embodiment of FIG. 39. The sealing member 1532 projects radially outward from the trailing side 52 of the annular gasket 1500. The sealing member 1532 comprises first 1566, second 1568, and third 1570 arcuate lobes. The arcuate lobes, 1566, 1568, 1570 are separated by arcuate recesses first 1572, second 1574, and third 1576, respectively.

The integral hinge gasket 1500 further comprises an upper portion 1580 that is defined by a portion of both the body region 1530 and sealing portion 1532 on the radially outward side 1582 of the gasket. The integral hinge gasket 1500 further comprises a lower portion 1590 defined by the body region 1530 on the radially inward side 1592 of the gasket, as illustrated in FIG. 39. The integral hinge gasket 1500 further comprises first and second bonding regions 1584 and 1586, respectively. The first bonding region 1584 is located near the apex 1536 and includes a fusing zone 1594 (shown in cross-hatch) of the first material 40. The second bonding region 1586 is located near the end 1564 of the upper plane 1538 and includes fusing zones 1596A and 1596B (shown in cross-hatch).

Referring now to FIGS. 40A and 40B, a sectional view of the annular integral gasket 1500 is shown seated in a channel portion of a first corrugated pipe 12 spigot 12A having a first end 1540, and in particular, fusing zone 1594 welded thereto, forming a fused bond "W" to the spigot. The fused bond W formed at the first end 1540 within the fusing zone 1594 integrally forms the materials of the first corrugated pipe 12 with the first material 40 of the gasket 1500 to make a first permanent connection 1600. The fused bond W forming the first permanent connection 1600 in the illustrated example embodiment is achieved by any number of processes capable of generating the necessary heat. Such processes include hot air melting, sonic welding, friction or spin welding, heat induction, infra-red heat melting, chemical welding, and the like. In the illustrated example embodiment, the permanent connection 1600 formed annularly along the gasket 1500 and spigot 12A by the fused bond W does not create a joint or slag that would rise above the upper plane 1538 along the upper portion 1580, thereby allowing a clearance transition of the mouth 20 of the bell as it passes over the body region 1530 of the gasket 1500.

FIG. 41 illustrates a sectional elevation view of the annular integral gasket 1500 seated in a channel portion of a first corrugated pipe 12 spigot 12A having a fusing arrangement 1610 fused into the upper portion 1580 of the gasket. In the illustrated example embodiment, the fusing arrangement 1610 is any electrically conductive material suitable for heat, resistance welding, or conductive welding. An example of a suitable fusing arrangement 1610 includes an annular copper insert approximately 0.005" to 0.010" inches thick. The material forming the fusing arrangement 1610 can also be simultaneously extruded or molded with any combination of first and second materials 40 and 42, respectively. Another example of a suitable fusing arrangement 1610 includes a product entitled "Power Welding Rod" manufactured by Powercore International, Ltd. of Ottawa, Ontario Canada found on the Internet at www.powercore.com. The specification of the Power Welding Rod is incorporated herein by reference.

When power or heat is applied to the gasket 1500 from the fusing arrangement 1610, a portion of the fusing arrangement is integrally bonded (as illustrated in FIG. 41), making a second permanent connection 1612 with fusing zone 1596A or 1596B, or both 1596A and 1596B along the upper portion 1580 of the gasket, as illustrated in FIG. 39. The first permanent connection 1600 at the first end 1540 of the gasket 1500 and the second permanent connection 1612 can be implemented by the manufacturer of the pipe at the manufacturer's facility or in the field.

Figure 42:
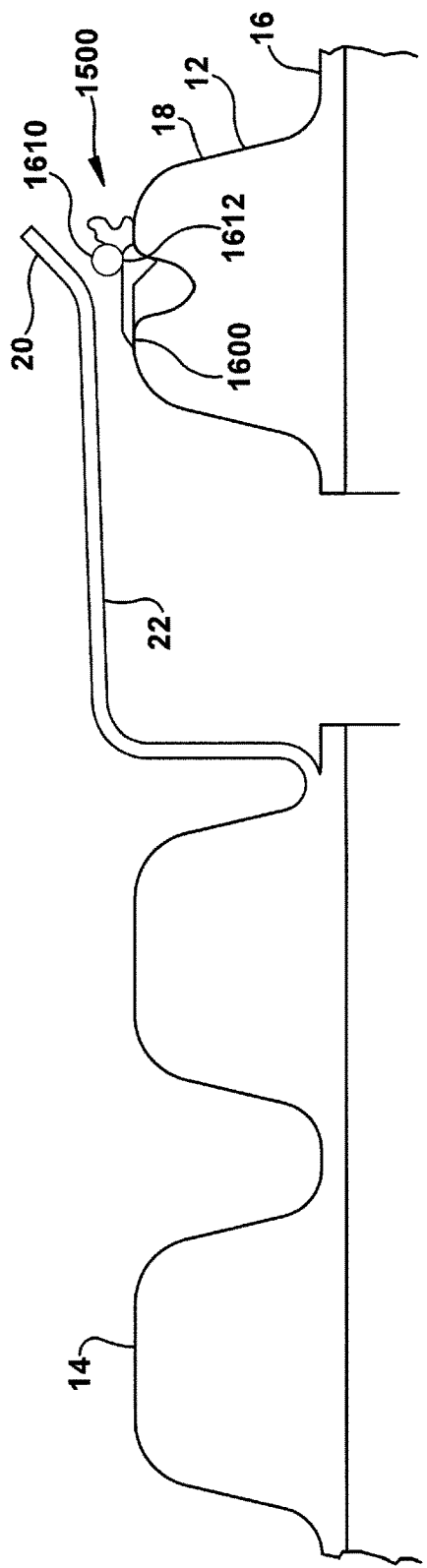
FIG. 42 is a sectional elevation view of the annular integral gasket of FIG. 39 seated in a channel portion of a first corrugated pipe spigot approached by a second corrugated pipe bell for forming a sealing connection therebetween.

Illustrated in FIG. 42 is a sectional elevation view of the annular integral gasket 1500 having first and second permanent connections 1600 and 1612 as described above. The gasket 1500 in FIG. 42 is seated in a channel portion of a first corrugated pipe 12 spigot 12A. FIG. 42 illustrates the process of joining the first pipe 12 with a second corrugated pipe 14, and in particular a bell 22 for forming a sealing connection 1700 with the gasket therebetween.

Figure 43:
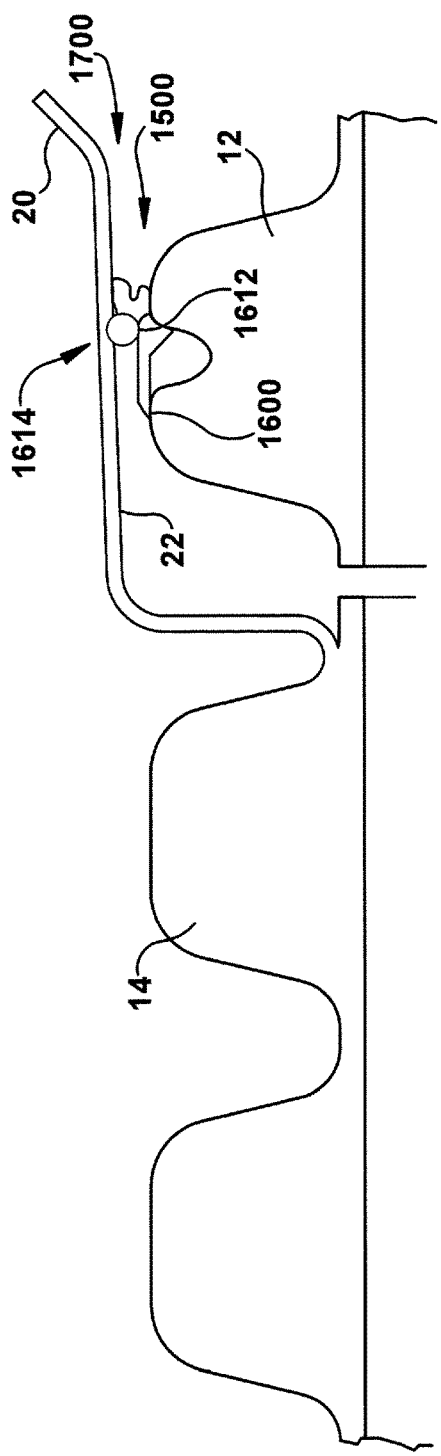
FIG. 43 is a sectional elevation view of the annular integral gasket of FIG. 39 seated in a channel portion of a first corrugated pipe spigot having a fusing arrangement fused into an upper portion of the gasket and a portion of a bell forming a second corrugated pipe.

FIG. 43 illustrates a sectional elevation view of the annular integral gasket 1500 having first and second permanent connections 1600 and 1612 as described above. The fusing arrangement 1610 in FIG. 43 illustrates the formation of a third permanent connection 1614 between the bell 22 of the second pipe 14 and the gasket 1500. In the illustrated example embodiment, the bell 22 passes over the spigot 12A and gasket 1500 until contact is achieved between the bell and gasket, and in particular, the fusing arrangement 1610. When power or heat is applied to fusing arrangement 1610, a portion of the fusing arrangement and/or gasket 1500 is integrally bonded (as illustrated in FIG. 43) with the bell 22, while maintaining the second permanent connection 1612 with the gasket and first permanent connection 1600 between the gasket and first pipe member 14.

Figure 44:
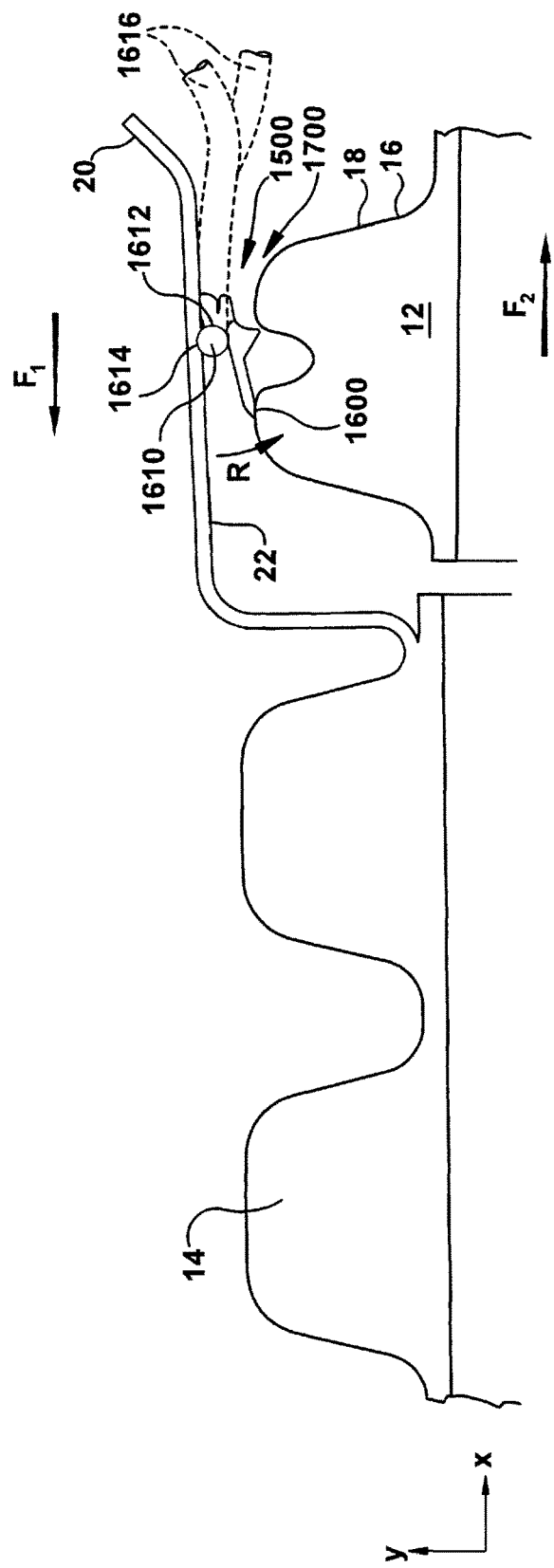
FIG. 44 is a sectional elevation view of the annular integral gasket of FIG. 39 fused to a spigot of a first corrugated pipe and a bell of a second corrugated pipe exposed to one or more forces to form a hinge-like sealing connection therebetween.

In an alternative example embodiment, the fusing arrangement 1610 is not in direct contact with the bell 22, but is in close enough proximity to the bell to cause the material forming the bell to melt and form the third permanent connection 1614 with the gasket and/or fusing arrangement when heat or power is applied to the fusing arrangement. The third permanent connection 1614 can be implemented by the manufacturer of the pipe at the manufacturer's facility or in the field. However, it is likely that the third permanent connection 1614 will occur in the field where the two pipe members 12 and 14 are typically joined. In one example embodiment, leads 1616 of the fusing arrangement to which power is applied are conveniently accessible for an installer of the pipe members. In particular, the leads 1616 pass through or over the sealing portion 1532 of the gasket 1500 out the opening of the mouth 20 for accessible connection to the user as illustrated in FIGS. 44 and 40B. In an alternative example embodiment, the leads 1616 pass through one or more outer openings in the bell 22 away from the seal 1700. In yet another example embodiment, the leads 1616 pass through an opening made in the gasket 1500. While in another example embodiment, the leads 1616 pass through an opening in the spigot 12A or in an opening formed in the gasket 1500 and spigot 12A that passes through to an inner diameter opening of the tubular member 12. In the above example embodiments, the leads 1616 can alternatively form a water-tight sealed connection in the opening formed by its passage in the bell 22, first tubular member 12, second tubular member 14, or gasket 1500, or any combination thereof when power is applied to the fusing arrangement 1610.

FIG. 44 is a sectional elevation view of the annular integral gasket 1500 having first, second, and third permanent connections 1600, 1612, and 1614, respectively as discussed above. The pipe members 12 and 14 are exposed to one or both forces F1 and F2, causing a hinge-like rotation of the gasket 1500 as indicated by Arrow R. The three permanent connections 1600, 1612, and 1614 are maintained to form the sealing connection 1700 between pipe members 12 and 14 despite forces F1 and/or F2. The sealing connection 1700 as described and the hinge-like rotation R provided by permanent connections 1600, 1612, and 1614 of the gasket 1500 provides a more robust sealing connection between pipe members 12 and 14, allowing for greater forces to be incurred and flexing of the pipes in X and Y directions (see FIG. 44) without compromising the water tight seal 1700.

In one example embodiment, the gasket 1500 is formed from a rigid plastic material such as polyethylene or polypropylene having a durometer between 40 and 50 on a Shore D scale and includes an overall diameter slightly smaller than the outer diameter of the spigot 12A of the first tubular member 12. The gasket 1500 is elastically stretched over the spigot 12A such that upon release, the shoulder member 1546 snaps into the recess into a secure position. The reduction in size of the gasket 1500 diameter is roughly 96% of the crest of the spigot 12A of inner pipe 12. Stated another way, for a twelve (12") inch outer most diameter inner pipe 12 at the spigot 12A, the diameter of the gasket 1500 would be undersized to a diameter of approximately eleven point five (11.5") inches.

This additional flexing in the rigid plastic forming the gasket 1500 is achieved by adding a flexing agent to the gasket's 1500 composition during the forming process. For polypropylene, an example of a suitable flexing agent is a commercial product called Vistamaxx manufactured by Exxon Mobile Chemical Company, the specification being incorporated herein by reference. For polyethylene, a suitable flexing agent is a commercial product called Engage manufactured by Dow Chemical, the specification being incorporated herein by reference.

A suitable formulation in the composition of the gasket 1500 in one example embodiment is approximately 30% flexing agent and 70% rigid plastic having a durometer between 80 Shore A scale and 50 Shore D scale. Stated another way, the flexing agent in the body region 1530 of the gasket 1500 is approximately 30% weight per unit volume, such as g/cm$^3$. In another example embodiment, the rigid plastic comprises polypropylene and the flexing agent comprises a propylene-based elastomer. In yet another example embodiment, the body region 1530 formed from only rigid plastic consisting of polypropylene and the flexing agent consisting of a propylene-based elastomer.

In yet another example embodiment, the body region 1530 comprises rigid plastic comprises polyethylene and the flexing agent comprises a polyolefin elastomer. While in another example embodiment, the body region 1530 is formed from only rigid plastic consisting of polyethylene and a flexing agent consisting of a polyolefin elastomer.

While a suitable formulation in the composition of the body region 1530 of the gasket 1500 in another example embodiment is approximately 30% flexing agent and 70% rigid plastic by weight per unit volume having a durometer between 80 Shore A scale and 50 Shore D scale, wherein in the flexing agent can be one or a combination of elements or compounds used to achieve the durometer range identified above. For example, the flexing agent could be a softer or lower grade elastomer that is added to the rigid plastic, whether synthetic or natural such as rubber.

In a recent test, a gasket 1500 having the 70/30 plastic/flexing agent composition was pressure tested without any welding or permanent connections to the first or second tubular members 12 and 14. That is, the gasket 1500 was secured to a twelve inch inner pipe 12 solely by the radial compressive force (see Arrow R in FIG. 40A) achieved through the under sizing of the gasket (11.5" inch diameter for 12" inch diameter pipe), the gasket's geometrical configuration, and flexing agent used in its composition. During the test, the gasket 1500 exceeded thirty minutes without a leak at a pressure of thirty (30) psi.

In another example embodiment, the gasket 1500 during installation is positioned on a first tubular member 12 and the fused bond W is formed between the gasket 1500 and a portion of the first tubular member to form the first permanent connection 1600. The first permanent connection is such that rotational movement of 180 degrees about the fused bond W will not allow the gasket to detach from the first tubular member. Such rotation about the first tubular member 12 by the gasket 1500 is illustrated by reference character R in FIG. 44.

In the illustrated example embodiment of FIGS. 40-44, the gasket 1500 spans a recess in the spigot 12A, allowing only the shoulder portion 1546 to penetrate into the recess. The fused bond W in addition to a point of flexible rotation of the gasket 1500 about the first pipe member 12, acts also as a lock and seal to resist dislodging of the gasket or the passage of water between the first and second 14 tubular members. The shoulder portion 1546 in the illustrated embodiment also acts as a lock to prevent dislodging of the gasket 1500 from a sealing connection. In particular, the location of the fused bond W at the apex 1536 of the gasket is positioned such that the first arc 1554 and shoulder back 1558 are in frictional contact with the recess of the spigot 12A, as illustrated in the example embodiment of FIG. 40A.

Third lobe 1570 and third recess 1576 act as a locator for the positioning fusing arrangement 1610 in accordance with one example embodiment of the present disclosure. In particular, the fusing arrangement 1610 is positioned on or near the third recess 1576 by the operator during installation. The third recess 1576 helps retain the annular fusing arrangement 1610 around the perimeter of the gasket 1500, while the third lobe 1570 helps hold the fusing arrangement in position. In an alternative example embodiment, the fusing arrangement 1610 is co-extruded into the first and/or second materials 40, 42 during the forming of the gasket 1500.

Once the fusing arrangement forms the second and third permanent connections 1612 and 1614, a second sealing boundary (the first permanent connection 1600 being the first) is formed around the perimeter of the gasket 1500 as illustrated in FIG. 43. A third sealing boundary is also formed by the compression of the second lobe 1568 in between first and second tubular members 12 and 14 as illustrated in FIG. 43. Hence it will be appreciated that the sealing connection of the illustrated example embodiment of FIG. 43 is advantageously improved in two additional locations over a conventional gasketdeed.

In the illustrated example embodiment of FIG. 39, the gasket 1500 if sized for a twenty-four inch (24") diameter first tubular member would have an overall length from a leading side 50 to trailing side 52 at the extremities of approximately one inch (1"). For the same size diameter tubular member 12, the thickness "t" between upper and lower planes 1538, 1544 would be approximately eighty-thousands of one inch (0.080"). While it would be appreciated one skilled in the art that the size of the gasket would increase proportionally for larger diameter pipes and decrease proportionally for smaller diameter pipes.

Figure 45:
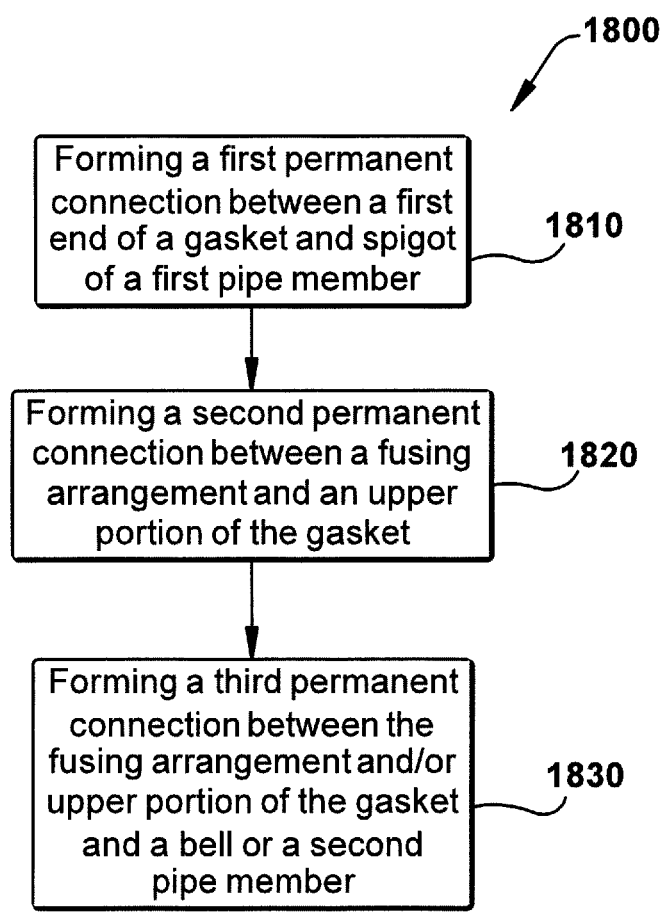
FIG. 45 is a process flow diagram of forming a sealing connection between two pipe member using a integral hinge connecting gasket.

FIG. 45 illustrates a process flow diagram 1800 for forming a sealing connection between two pipe member using a integral hinge connecting gasket 1500. At 1810, the process 1800 comprises forming a first permanent connection between a first end of a gasket and a spigot of a first pipe member. At 1820, the process 1800 comprises forming a second permanent connection between a fusing arrangement and an upper portion of the gasket. At 1830, the process 1800 comprises forming a third permanent connection between the fusing arrangement and/or upper portion of the gasket and a bell of a second pipe member.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. An annular integral gasket for forming a sealing connection between a first tubular member and a second tubular member, the integral gasket comprising:
   at least one flexible sealing portion adapted to form a sealing connection between a first tubular member and a second tubular member;
   a bonding layer adapted to be fixedly attached to a tubular member by a joining process; and
   a body region adapted for supporting said flexible sealing portion and said bonding layer, the body region including a lower plane and the flexible sealing portion including a lower plane coplanar with the lower plane of the body region, wherein the body region includes a shoulder portion extending from the lower plane of the body region to the lower plane of the flexible sealing portion and extending radially inward of the flexible sealing portion.

2. The annular integral gasket of claim 1 wherein said bonding layer and said flexible sealing portion are collectively formed into a single structure by one of an extruding and a molding process.

3. The annular integral gasket of claim 1 further comprising a fusion section located in said body region near said bonding layer, and an electrically conductive fusing arrangement engaging the fusion section such that current applied to the fusing arrangement forms a welded comlection between the fusion section and the fusing arrangement, said fusion section adapted to provide heat from the fusing arrangement to said annular integral gasket and said bonding layer such that the bonding layer fixedly adapts to a mating tubular member to form an integral connection.

4. The annular integral gasket of claim 1 further comprising a lubricated portion located on said at least one flexible sealing portion adapted to lower the friction between said annular integral gasket and contacting tubular member during assembly in forming a sealing connection.

5. The annular integral gasket of claim 4 wherein said body region is made from a first material, said at least one flexible sealing portion is made from a second material and said lubricated portion is made from a third material and said bonding layer is made from a fourth material, each of said materials being different and formed from one of a single extruded and molded process to collectively form said annular integral gasket.

6. The annular integral gasket of claim 1 further comprising an undulating forming edge for supporting and affixing said annular integral gasket to a tubular member having a corrugated surface.

7. The annular integral gasket of claim 1 further comprising a linear bonding layer adapted to fuse with an inner diameter of a tubular member.

8. The annular integral gasket of claim 1 wherein said flexible sealing portion comprises a first material having a first durometer and said body region comprises a second material having a second durometer different than said first durometer.

9. The annular integral gasket of claim 1 wherein said flexible sealing portion comprises a first material having a first durometer, said body region comprises a second material having a second durometer, and said bonding layer comprises a third material having a third durometer, the first, second, and third durometers having different values.

10. An annular integral gasket assembly comprising:
    at least one flexible sealing portion adapted to form a sealing connection between a first tubular member and a second tubular member; and
    a body region adapted for supporting said flexible sealing portion, the body region being integrally connected by one of molding and extruding said body region to said sealing portion; and
    the body region having a composition comprising approximately 70% w/v rigid plastic and the remaining approximately 30% w/v flexing agent and a rigid plastic, the body region further having a first durometer and said sealing portion having a second durometer, wherein said first durometer is higher than said second durometer, the body region further comprising a lower plane substantially parallel to an upper plane, with at least one first bonding region extending from the lower plane and adapted to form a direct bond with at least one of the first tubular member and the second tubular member, and the lower plane further comprising a shoulder portion having a wedge surface extending to a radial apex returning along a curvilinear path extending from the radial apex to an intersection between said body region and said sealing portion, the shoulder portion and the body region being formed as a unitary structure.

11. The annular gasket of claim 10 wherein said rigid plastic comprises polypropylene and said flexing agent comprises a propylene-based elastomer.

12. The annular gasket of claim 10 wherein said rigid plastic consists of polypropylene and said flexing agent consists of a propylene-based elastomer.

13. The annular gasket of claim 10 wherein said rigid plastic comprises polyethylene and said flexing agent comprises a polyolefin elastomer.

14. The annular gasket of claim 10 wherein said rigid plastic consists of polyethylene and said flexing agent consists of a polyolefin elastomer.

15. An annular integral gasket assembly comprising:
    at least one flexible sealing portion adapted to form a sealing connection between a first tubular member and a second tubular member;
    a body region adapted for supporting said flexible sealing portion, the body region being integrally connected by one of molding and extruding said body region to said sealing portion;
    the body region further comprising a lower plane substantially parallel to an upper plane, the body region spacing a leading side from a tailing side of said gasket, the leading side having an apex extending from said lower plane to an inclined surface that extends to said upper plane, said trailing side having a sealing region that extends from a region substantially parallel with said lower plane radially outward from said upper plane; and a shoulder portion of the body region extending radially inward from said lower plane, the shoulder comprising a radial apex dividing a wedge surface from a curvilinear path that extends from the radial apex to an intersection between said sealing member and said body region.

16. The annular gasket of claim 15 wherein the body region includes a composition comprising approximately 70% w/v rigid plastic and the remaining approximately 30% w/v flexing agent and a rigid plastic, the body region further having a first durometer and said sealing portion having a second durometer, wherein said first durometer is higher than said second durometer.

17. The annular gasket of claim 15 wherein said rigid plastic comprises polypropylene and said flexing agent comprises a propylene-based elastomer.

18. The annular gasket of claim 15 wherein said rigid plastic consists of polypropylene and said flexing agent consists of a propylene-based elastomer.

19. The annular gasket of claim 15 wherein said rigid plastic comprises polyethylene and said flexing agent comprises a polyolefin elastomer.

20. The annular gasket of claim 15 wherein said rigid plastic consists of polyethylene and said flexing agent consists of a polyolefin elastomer.

21. The annular gasket of claim 15 further comprising parallel upper and lower planes formed along the body region, the lower plane further comprising a shoulder portion having a wedge surface extending to a radial apex returning along a curvilinear path extending from the radial apex to an intersection between said body region and said sealing portion.

22. The annular gasket of claim 1, wherein the shoulder extends to only one side of the lower planes.

23. The annular gasket of claim 1, wherein the shoulder is unstressed when the sealing connection is formed.

24. The annular gasket of claim 15, wherein the intersection to which the radial apex of the curvilinear path extends is positioned within the lower plane.

* * * * *